US010567467B2

(12) United States Patent
Sreevalsan et al.

(10) Patent No.: US 10,567,467 B2
(45) Date of Patent: Feb. 18, 2020

(54) SYSTEM AND METHOD FOR HEURISTIC CONTROL OF NETWORK TRAFFIC MANAGEMENT

(71) Applicant: SANDVINE INCORPORATED ULC, Waterloo (CA)

(72) Inventors: Shyam Sreevalsan, Calicut (IN); Kathiravan Rajasekar, Bangalore (IN); Steven J. Flatt, Kitchener (CA); Akash Suresh, Mysore (IN); Felix-Antoine R. Bouchard, Calgary (CA)

(73) Assignee: SANDVINE CORPORATION, Vancouver, British Columbia (CA)

( * ) Notice: Subject to any disclaimer, the term of this patent is extended or adjusted under 35 U.S.C. 154(b) by 143 days.

(21) Appl. No.: 15/189,093

(22) Filed: Jun. 22, 2016

(65) Prior Publication Data

US 2016/0373510 A1  Dec. 22, 2016

(30) Foreign Application Priority Data

Jun. 22, 2015  (IN) .............................. 690/KOL/2015

(51) Int. Cl.
*G06F 15/173* (2006.01)
*H04L 29/06* (2006.01)
(Continued)

(52) U.S. Cl.
CPC .............. *H04L 65/80* (2013.01); *H04L 43/08* (2013.01); *H04L 67/10* (2013.01)

(58) Field of Classification Search
CPC ..... H04L 43/16; H04L 43/08; H04L 41/5067; H04L 43/04; H04L 47/12; H04L 65/80; H04L 43/024
(Continued)

(56) References Cited

U.S. PATENT DOCUMENTS 7,142,512 B1 * 11/2006 Kobayashi .......... H04L 41/5019
370/232
9,300,554 B1 * 3/2016 Kosai ................ G06F 16/24578
(Continued)

FOREIGN PATENT DOCUMENTS

EP       2611074 A1   7/2013
EP       2632100 A1   8/2013
EP       2860939 A1   4/2015

OTHER PUBLICATIONS

European Patent Office, European Search Report on European Patent Appln. No. 16175681.2, dated Oct. 20, 2016.

*Primary Examiner* — Dustin Nguyen
*Assistant Examiner* — Hao H Nguyen
(74) *Attorney, Agent, or Firm* — Gowling WLG (Canada) LLP; Neil W. Henderson

(57) ABSTRACT

A method for heuristic control of traffic management on a computer network, the method including: setting predetermined benchmarks for traffic; performing a traffic management control loop to determine at least one value of a quality of experience (QoE) metric, via a QoE measuring module, on the network based on the traffic flow; performing a heuristic control loop comprising: aggregating the at least one value of the QoE metric obtained from the traffic management control loop; determining a new benchmark based on the aggregation of the QoE metric, via a heuristic control module; and sending the new benchmark to the QoE measuring module. a system for heuristic control of traffic management on a computer network, the system including: a heuristic calibration module configured to set predetermined benchmarks for traffic; a QoE module configured to determine at least one value of a quality of experience (QoE) metric, on the network based on the traffic flow; an analysis module configured to aggregate the at least one value of the QoE metric obtained from the traffic management control loop; the heuristic calibration module further configured to determine a new benchmark based on the aggregation of the QoE metrics; and send the new benchmark to the QoE measuring module.

15 Claims, 18 Drawing Sheets

(51) Int. Cl.
*H04L 12/26* (2006.01)
*H04L 29/08* (2006.01)

(58) Field of Classification Search
USPC ........ 709/223, 224, 225; 370/224, 229, 230, 370/235, 253, 516
See application file for complete search history.

(56) References Cited

U.S. PATENT DOCUMENTS

| | | | |
|---|---|---|---|
| 2007/0242702 A1* | 10/2007 | Shim | H04L 43/00 370/516 |
| 2009/0059791 A1* | 3/2009 | Saxena | H04L 41/0896 370/235 |
| 2009/0279433 A1* | 11/2009 | Briscoe | H04L 43/00 370/235 |
| 2012/0173722 A1* | 7/2012 | Chen | H04L 12/1895 709/224 |
| 2013/0166730 A1* | 6/2013 | Wilkinson | H04L 41/142 709/224 |
| 2013/0223207 A1* | 8/2013 | Bouchard | H04L 47/26 370/229 |
| 2013/0263167 A1* | 10/2013 | Parthasarathy | H04L 41/5067 725/14 |
| 2014/0226799 A1 | 8/2014 | Aggarwal et al. | |
| 2014/0297837 A1* | 10/2014 | Agarwal | G06Q 10/101 709/224 |
| 2015/0063106 A1* | 3/2015 | Devi | H04L 47/19 370/235 |
| 2016/0105346 A1* | 4/2016 | Pignataro | H04L 63/104 370/253 |
| 2017/0302539 A1* | 10/2017 | Park | H04L 41/5016 |

* cited by examiner

SYSTEM AND METHOD FOR HEURISTIC CONTROL OF NETWORK TRAFFIC MANAGEMENT

FIELD

The present disclosure relates generally to management of network services. More particularly, the present disclosure relates to a system and method for heuristic control of traffic management.

BACKGROUND

Conventionally, network traffic management systems attempt to avoid congestion by applying traffic management to the types of network traffic that are mostly likely to cause congestion. For example, by limiting bandwidth available to users of predetermined types of traffic such as peer-to-peer (P2P) or the like. In other cases, traffic management may manage traffic only during peak hours by limiting bandwidth per user during these peak times. These types of solutions can, in some cases, actually lower the Quality of Experience (QoE) by affecting subscribers even in the absence of actual congestion, restricting them from using bandwidth that would otherwise be available to them. Further, these conventional solutions may not actually solve the underlying traffic management problem because the sum of the enforcement policies may still be less than what is required to relieve congestion. For example, there may be few or no heavy users or a low amount or no low priority traffic, such as P2P or bulk downloads, but the network may still suffer from congestion.

It is, therefore, desirable to provide novel and improved traffic management systems and methods.

SUMMARY

In a first aspect, the present disclosure provides a method for heuristic control of traffic management on a computer network, the method including: setting predetermined benchmarks for traffic; and periodically performing a heuristic control loop comprising: performing a traffic management control loop to determine a plurality of sample values of a quality of experience (QoE) metric, via a QoE measuring module, on the network based on the traffic flow; aggregating the plurality of sample values of the QoE metric obtained from the traffic management control loop; determining a new benchmark based on the aggregation of the QoE metric, via a heuristic control module; and sending the new benchmark to the QoE measuring module to become the predetermined benchmark.

In a particular case, the determining the new benchmark may include: aggregating a plurality of the plurality of sample values to determine a plurality of interim benchmark values; selecting a predetermined number of the plurality of interim benchmark values; and calculating a new benchmark based on the plurality of interim benchmark values.

In another particular case, the traffic management control loop may include: monitoring traffic on the network to retrieve values related to the QoE metric; analyzing the retrieved values related to the QoE metric with the predetermined benchmark; and determining a traffic management action based on the analysis.

In still another particular case, the aggregating of the sample values may include generating a histogram of the sample values.

In yet another particular case, the QoE metric may be selected from the group comprising: access Round Trip Time (aRTT), Mean opinion score (MOS), HTTP mean time to page load, HTTP mean time to page render, TCP retransmits, DNS response time, ping response time, video QoE, video jitter, gaming jitter, gaming latency, speed test or 3rd party QoE measurement.

In still yet another particular case, determining the new benchmark based on the aggregation of the QoE metric may further include: calculating a change between the predetermined benchmark and the new benchmark; determining whether the change meets a predetermined tolerance range; if the change meets the tolerance range, setting the new benchmark to be the same as the predetermined benchmark.

In a particular case, the heuristic control loop is performed on a 24 hour interval.

In another aspect, there is provided a system for heuristic control of traffic management on a computer network, the system including: a heuristic calibration module configured to set predetermined benchmarks for traffic; a QoE module configured to determine a plurality of sample values of a quality of experience (QoE) metric, on the network based on the traffic flow; an analysis module configured to aggregate the plurality of sample values of the QoE metric obtained from the traffic management control loop; the heuristic calibration module further configured to determine a new benchmark based on the aggregation of the QoE metrics; and send the new benchmark to the QoE measuring module to become the predetermined benchmark.

In a particular case, the analysis module may be further configured to aggregate a plurality of the plurality of sample values to determine a plurality of interim benchmark values; and the heuristic calibration module is configured to select a predetermined number of the plurality of interim benchmark values, and calculate a new benchmark based on the plurality of interim benchmark values.

In still another particular case, the QoE measurement module may be configured to monitor traffic on the network to retrieve the plurality of sample values related to the at least one QoE metric; and the system may further include: a control system module configured to analyze the retrieved values related to the at least one QoE network with the predetermined benchmark; and a traffic management module configured to determine a traffic management action based on the analysis.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides for a method and system for heuristic control of traffic management which are intended to manage congestion in a network, such that congestion is reduce. The method and system provided are intended to maintain a desired level of quality of experience (QoE) for users in a network. QoE is a measurement of how well a network is satisfying end users requirements. Typically, high latency, low throughput, jitter in audio, video or gaming are all regarded as providing poor user experience; conversely low latency, high throughput and seamless audio/video/gaming are regarded as providing, an expected or good user experience. The method and system of the present disclosure may be particularly useful in networks where the network capacity is not known or is highly variable (for example, mobile networks). The method and system provided are intended to leverage the generally coupled nature of QoE and congestion, namely that when congestion occurs, QoE degrades.

The embodiments of the method and system described herein are generally configured to measure at least one characteristic indicative of QoE in real-time and then use the resulting measurements to implement one or more traffic management techniques or actions. In particular, the measurements are fed into a control module, which then reviews the measurements to create an output, which is used to select or implement one or more a traffic management actions or technologies, for example, shaping, marking packets, reprioritizing low priority traffic, reprioritizing heavy users on a congested link, etc. Generally speaking, when QoE degrades, the control module may apply additional traffic management techniques, when QoE improves, the control module may apply fewer or no traffic management techniques. By using an appropriate QoE measurement(s), traffic management technology(ies) and a properly configured and tuned control module, the method and system are intended to provide a desired amount of traffic management to maintain a desired level of QoE at all times, and, in particular, during times of congestion. Further, the measurements may be fed into a heuristic control module configured to aggregate the QoE measurements in order to provide appropriate benchmarks for an appropriate level of QoE for the network. The benchmarks may adapt to changes in the network. In general, the system and method are configured to learn the capacity of the network by monitoring QoE.

Figure 1:
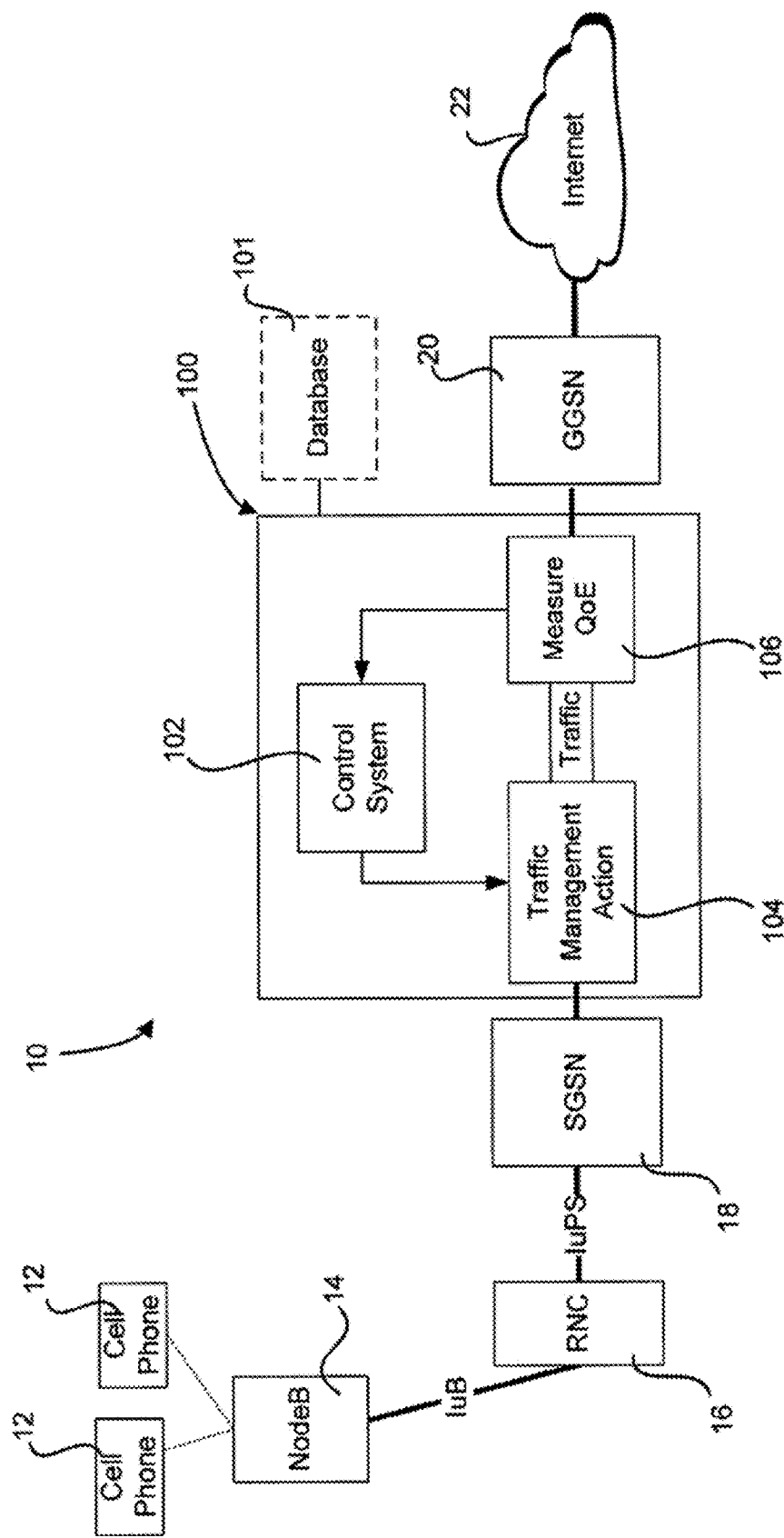
FIG. 1 illustrates an embodiment of a traffic management system in a mobile network.

FIG. 1 illustrates an embodiment of a system for traffic management 100 in a Third Generation Partner Program (3GPP) mobile network 10. The system for traffic management includes a control module 102, a traffic management module 104 and a QoE measurement module 106. In this embodiment, the system 100 is deployed inline such that the control module 102 will have visibility of all traffic passing for downstream nodes. It will be understood that the system 100 may be deployed in other ways or other configurations that still allow monitoring of traffic even if not in-line. Further, it will be understood that the system may alternatively monitor an appropriate subset of all traffic.

The system for traffic management may include a subscriber database 101 for storing data related to network subscribers. The subscriber database 101 may be located internal or external to the system 100 and connected to the system 100 via a network. The subscriber database 101 may be similarly included in networks 30, 40 of FIGS. 2 and 3.

In the mobile network 10, a user device 12, such as a mobile or cellular (cell) phone, may be in communication with a Node B device 14. The Node B device 14 provides an interface to a radio network controller (RNC) 16 (IuB). The RNC 16 is in communication with a serving general packet radio service (GPRS) support node (SGSN) 18 through a packet switch interface (IuPS). In this configuration, the system 100 interfaces with both the SGSN 18 and a gateway GPRS support node (GGSN) 20. The GGSN then communicates with a network 22 such as the Internet. The system 100 can generally be configured or deployed to manage congestion for any link in the hierarchy shown including the IuPS interface, the IuB, and the air interface.

Figure 2:
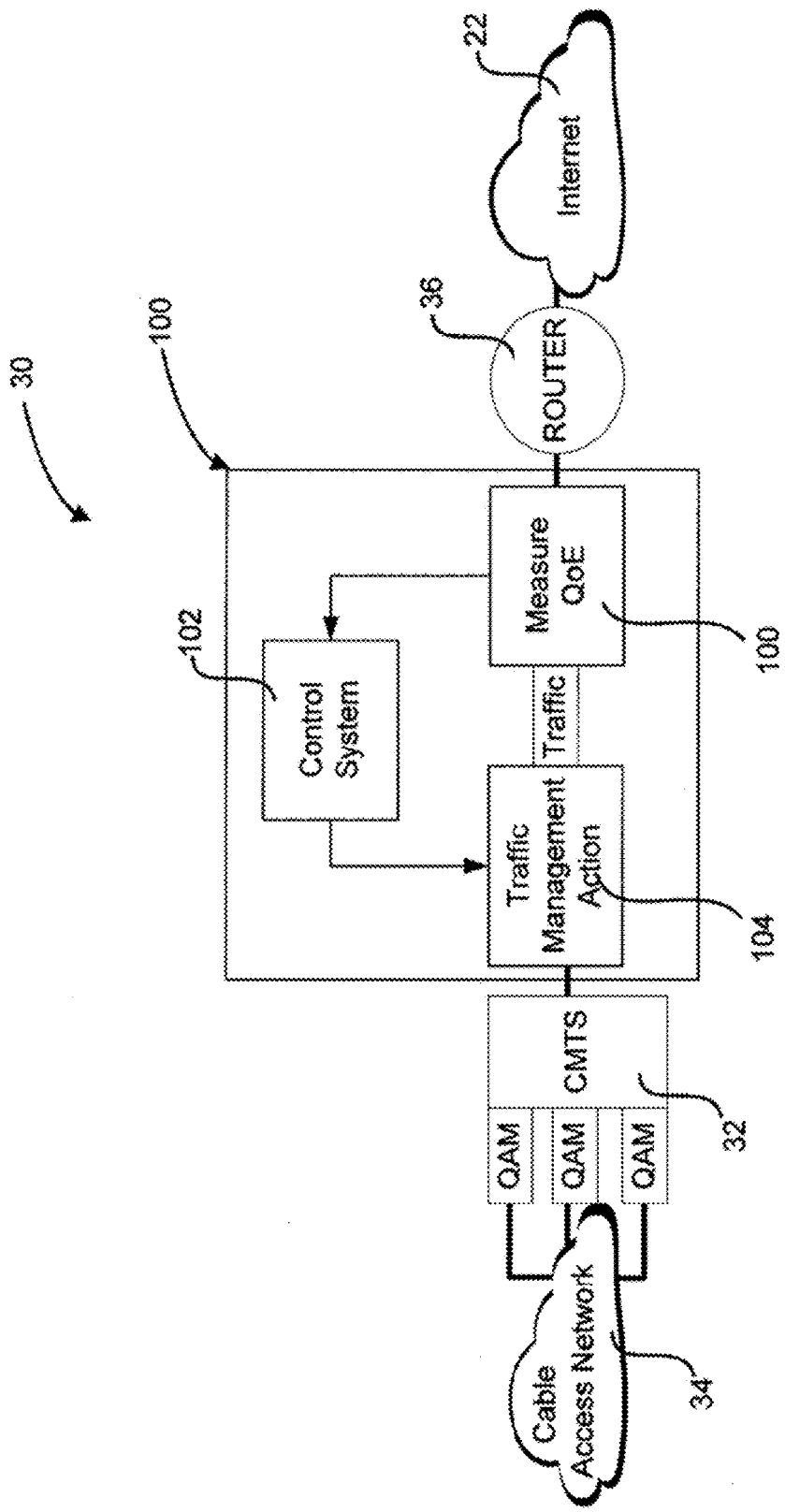
FIG. 2 illustrates an embodiment of a traffic management system in a cable network.

FIG. 2 illustrates a cable network 30, where the embodiment of the system 100 is deployed to have visibility of all traffic passing through a cable modem termination station (CMTS) 32, which receives data from a cable access network 34. The system 100 may manage congestion at the aggregate CMTS level or any channel (for example, Data Over Cable Service Interface Specification (DOCSIS 3)) below the aggregate CMTS, by determining and adjusting to the CMTS/channel capacity. In this embodiment, the system 100 would also be connected to the Internet 22 through a router 36.

Figure 3:
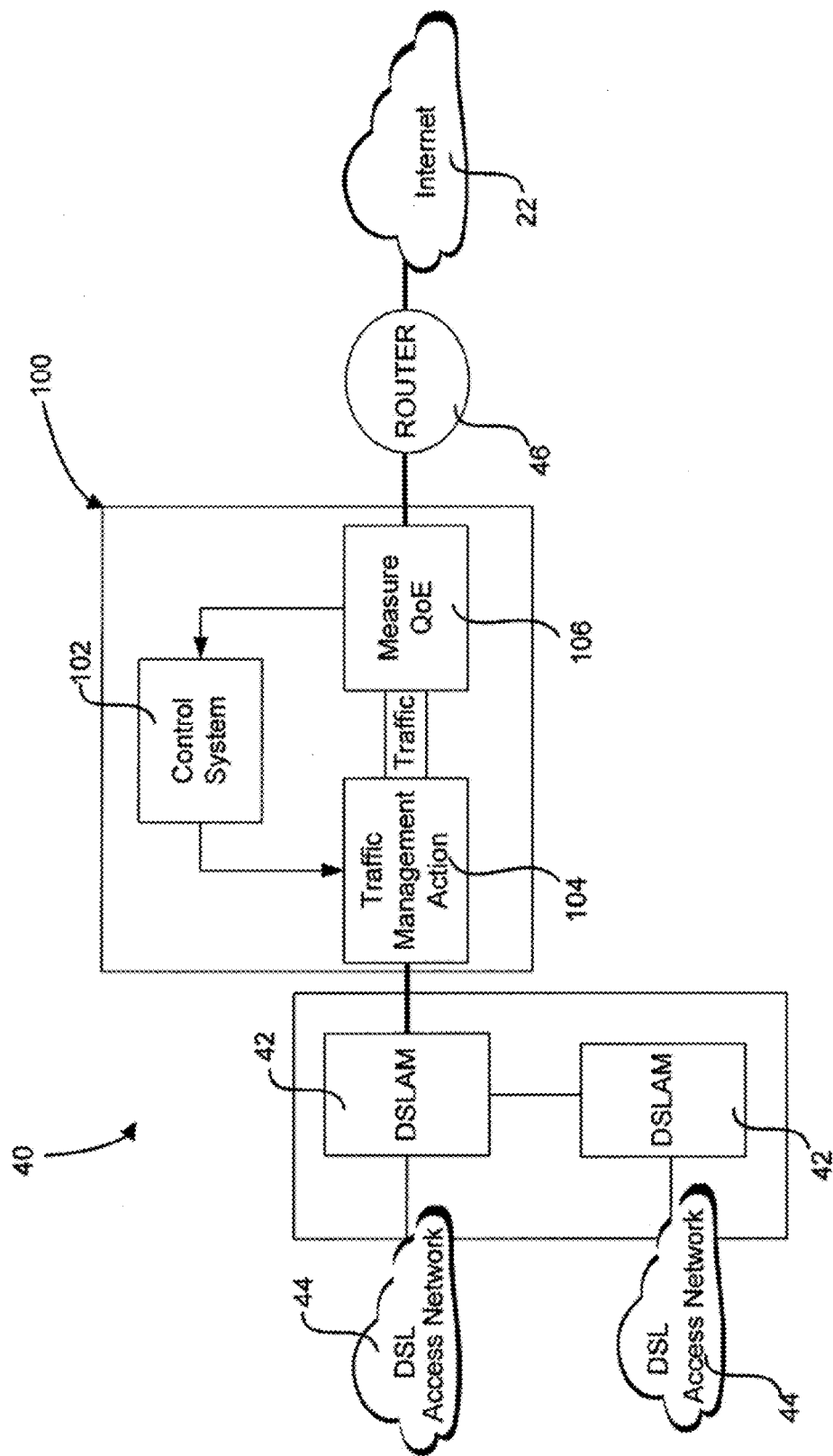
FIG. 3 illustrates an embodiment of a traffic management system in a DSL network.

FIG. 3 illustrates an embodiment of the system 100 in a Digital Subscriber Line (DSL) network 40. In this network topology, two co-located Digital Subscriber Line Access Multiplexers (DSLAMs) 42 share a backhaul link and are connected to a DSL Access Network 44. Even though the utilization on the inner link may be unknown to the system 100, the system 100 would be capable of relieving congestion on either DSLAM 42 based on the quality of experience of the subscribers the DSLAM 42 services. In this configuration, the system 100 is able to apply traffic management techniques to traffic received from the Internet 22 through a router 46.

It will be understood that a system similar to the system 100 could be deployed on other networks, for example, a Long Term Evolution (LTE), 3rd Generation Partnership Program (3GPP), 3GPP2, WiMax, Cable or the like. The system 100 could also be deployed at various levels of topology in a network where the system 100 has appropriate visibility of the traffic flowing to or from a node. In this disclosure, where appropriate, a node refers to any logical grouping of traffic where the QoE of the traffic measured may be impacted by managing the traffic at that point.

The system 100 is intended to use traffic management to control the supply of or access to one or more fixed resources, for example, controlling total bandwidth, limiting high priority bandwidth or traffic, limiting low priority bandwidth or traffic, limiting subsets of traffic by netclasses, etc., with the aim of improving or maximizing the QoE of subscribers within the constraints of the fixed resources. In order to accomplish this aspect, the system determines current fixed resource capacity and may restrict supply to an amount that provides improved QoE according to predetermined policies. In some cases, the system 100 may be the sole source of policing in the network.

In one embodiment, the method used by the system 100 may employ an underlying hypothesis that there is an ideal traffic rate M(t) for a fixed resource which is unknown to the network (for example, CMTS rate, DSLAM rate, Node B, or the like, depending on the network). The system 100 does not require that the ideal traffic rate M(t) remain static. Once the system 100 adjusts the supply to this ideal traffic rate M(t), the system 100 then continues monitoring to allow the system 100 to adapt to changes in the ideal traffic rate M(t) over time.

In particular, the system 100 receives QoE measurements from the QoE measurement module 106 and reviews the data such that an output value O(t) is determined. The control module 102 (working with the traffic management module 104) is configured such that the output value O(t) will converge on the unknown value of M(t) over time. Further, as the system 100 continues to receive QoE measurements, the control module 102 works to dynamically re-converge on M(t) in the event that the value of M(t) changes.

Figure 4:
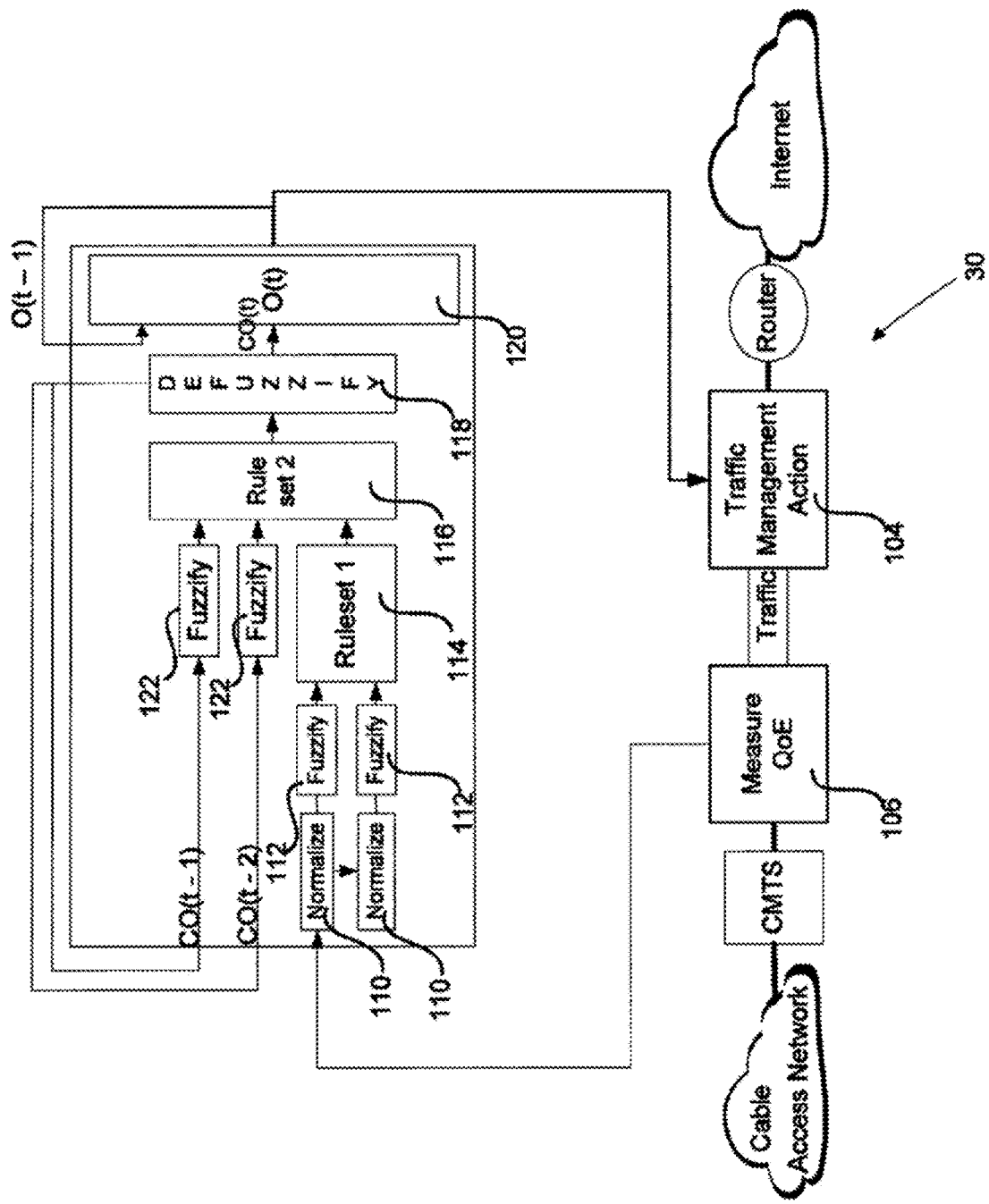
FIG. 4 further details an embodiment of the traffic management system as in FIG. 2.

FIG. 4 illustrates one embodiment of the system 100 showing the control module 102 in more detail. In this case, the system 100 is in a cable network 30 and the control module 102 is using fuzzy logic control as a method of controlling traffic management.

When a subscriber has an active session or creates a new session on the internet, traffic for that subscriber will flow through the QoE measurement module 106, which is configured to measure and/or monitor the subscriber's QoE. The QoE metric could be one of, or a combination of, for example, the access round trip time (aRTT), unidirectional delay, duplicate transmission control protocol (TCP) acknowledgment (ACKS), voice over internet protocol (VOIP) mean opinion score (MOS), hypertext transfer protocol (HTTP) mean time to page load, HTTP mean time to page render, TCP retransmits, domain name system (DNS) response time, throughput of bulk transfers, ping response time, gaming jitter, gaming latency, video jitter, video QoE, speed test, other 3rd party QoE measurement or the like. It will be understood that some metrics may be more or less applicable/available depending on the location of the system 100 in a network. Further, it will be understood that the system 100 is intend to work with any appropriate QoE metric, now known or hereafter developed. The metric or metrics measured are then passed to the control module 102. Still further, it will be understood that the QoE measurement module 106 may also receive and monitor QoE measurements received from another source that is configured to measure QoE.

In FIG. 4, QoE metric measurements measured by the QoE measurement module 106 are transmitted to at least one normalization module 110 (two modules shown), which normalizes the measurements prior to transmitting the normalized measurements to at least one fuzzy logic module 112 (two modules shown). It will be understood that the control module 102 may also use the raw measurement itself rather than a normalized value but this may require amending boundaries on the input fuzzy sets. It will further be understood that the number of normalization modules 110 and the like may depend on the number of QoE metrics being monitored.

After application of the fuzzy logic by the fuzzy logic module 112, the modified measurements are transmitted to a rule set component 114, which applies predefined rules to the modified measurements to provide a ruleset output.

In this embodiment, the ruleset output is passed into a second rule set component 116 where the ruleset output may be combined with results from previous time intervals, as described herein. The second ruleset output is then processed by a logic module 118 configured to apply logic to defuzzify the measurements. The resulting crisp output CO(t) is transmitted to an output module 120 and an output O(t) is sent to the traffic management module 104 where traffic management actions may be applied to the traffic based on the output as described herein. The output O(t) may be equivalent to the crisp output value CO(t), which can be interpreted by the traffic management module 104 such that an appropriate traffic management action may be applied to the network, or the output O(t) may be a traffic management action itself which can be initiated by the traffic management module 104.

The crisp output CO(t) may also be transmitted to at least one fuzzy logic module 122, which may be a separate module than the at least one fuzzy logic modules 112 or may be integrated as part of the same fuzzy logic module. In this case, the crisp output CO(t) may be marked as the crisp output from a previous time interval, for example CO(t−1). The fuzzy logic modules 122 are intended to apply fuzzy logic to the crisp outputs for a number of previous time intervals, for example the last two time intervals, CO(t−1) and CO(t−2). The modified outputs of these previous time intervals are then combined in the second rule set component 116 with the current time output to create a second ruleset output that passes through the output module and then transmitted to the traffic management module 104.

Although the present disclosure describes how the method can be applied using fuzzy logic, similar methods can be implemented using a neural network controller, a controller utilizing genetic algorithms, or other appropriate adaptive approximation based control now known or hereafter developed. For example, a normalized QoE measurement input could be used as an input to an artificial neural network, where the fuzzy modules and rules may be replaced by a fitness function with configured hidden nodes. In this example, the output may be treated in the same or very similar manner to the described fuzzy logic controller system output as described herein.

Figure 5A:
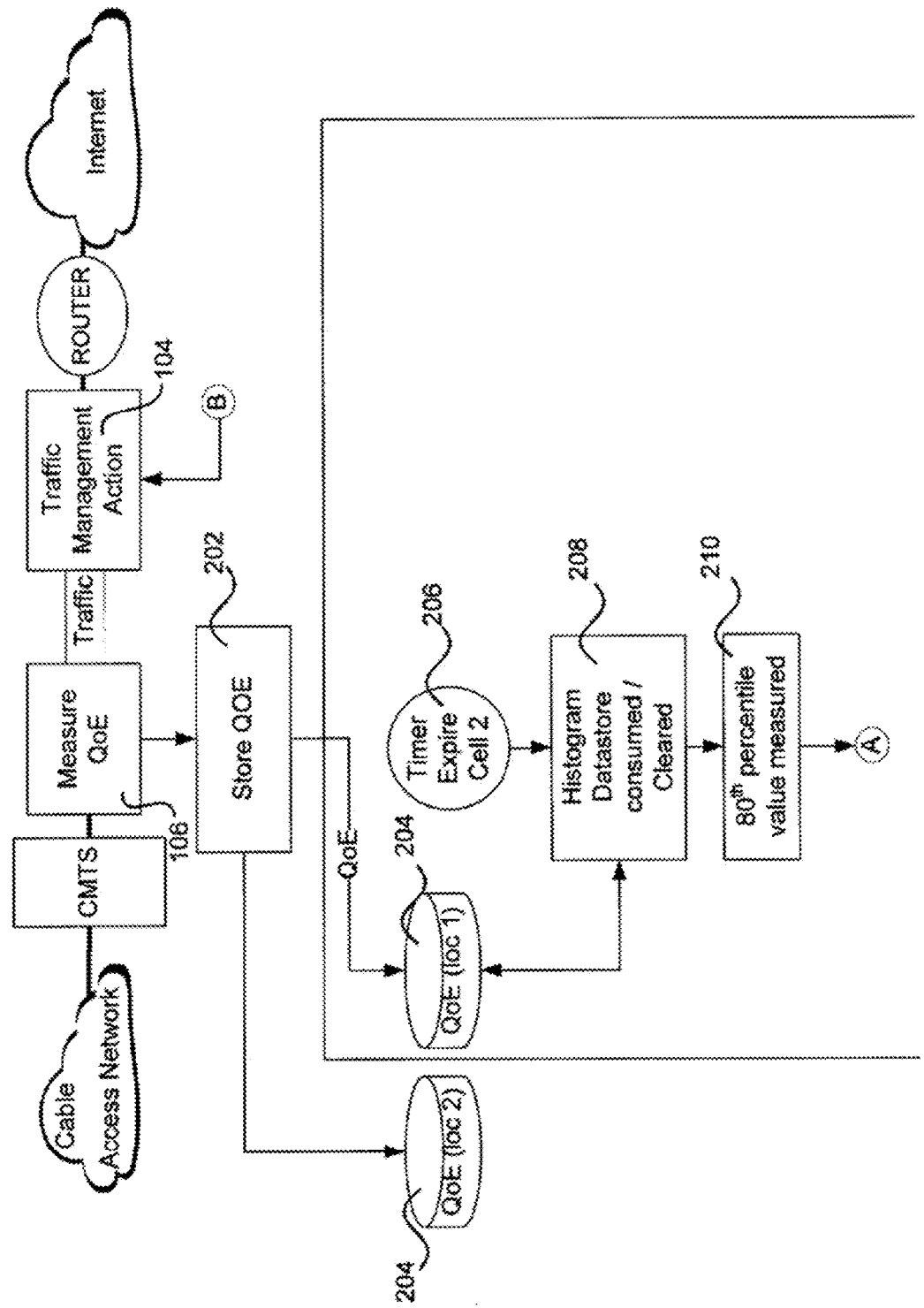
FIGS. 5A and 5B is a flow chart of a method for traffic management.
Figure 5B:
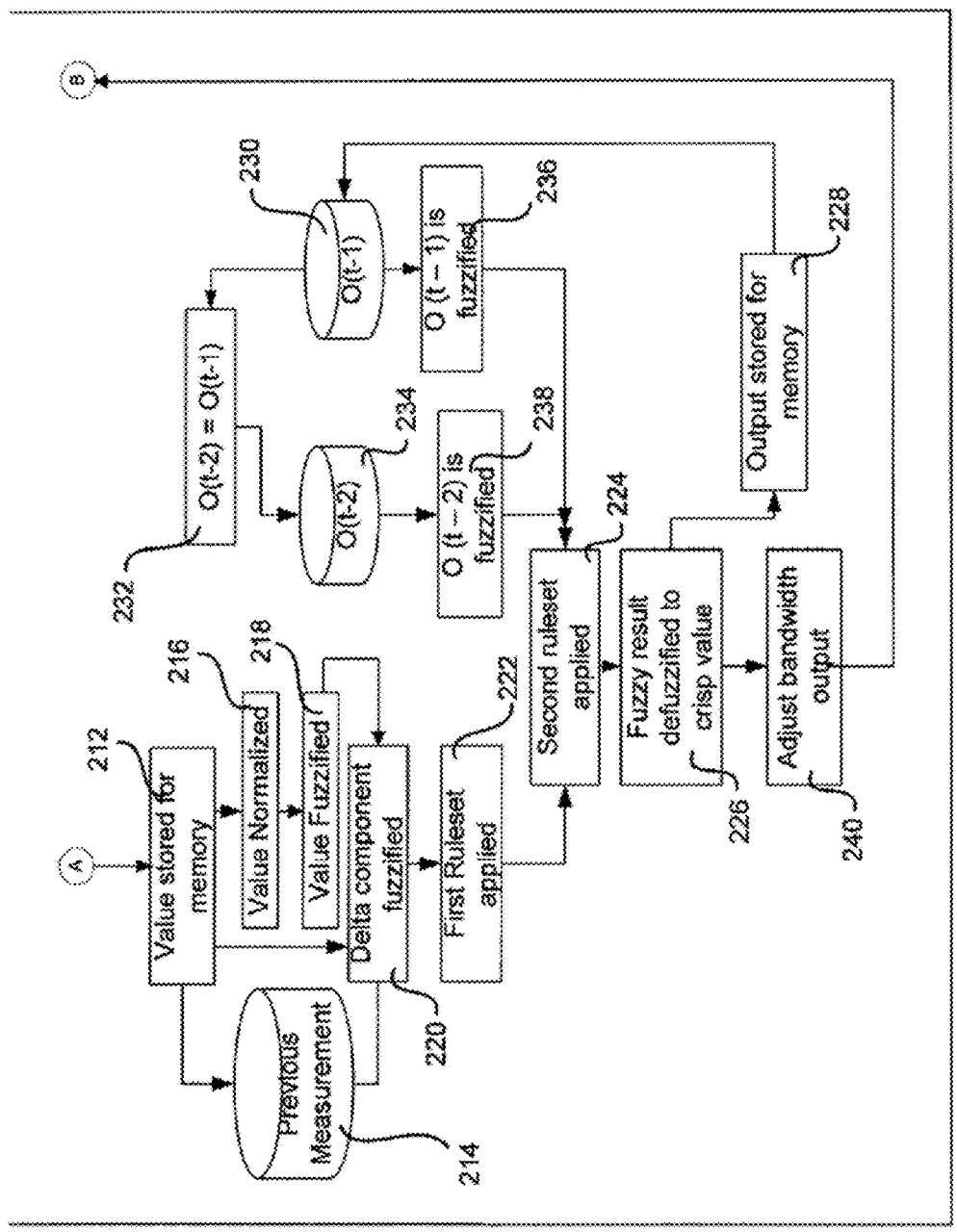

FIGS. 5A and 5B illustrate a flow chart of an embodiment of a method for traffic management 200. The method may be implemented by a control module similar to that of the control module 102 illustrated in FIG. 4. When the QoE measurement module 106 measures at least one QoE metric, the at least one QoE metric is stored 202 in at least one datastore 204. The datastore 204 may be used for all samples taken for a resource being controlled. For example, if the resource being controlled is a cell in a 3GPP wireless network, then all new flows or a sufficient subset of flows that are relevant for that cell would be sampled for their QoE and each one or a subset may be stored in the datastore 204.

In an example, if the QoE metric used is access round trip time (aRTT), then all new transmission control protocol (TCP) flows would be measured for their respective aRTT value. In a particular example, the TCP aRTT may be measured as the time between synchronization sequence number (SYN) and SYN-ACK in a new subscriber server TCP session, and time between a SYN-ACK and ACK in a new subscriber client TCP session.

In another example, if the QoE metric used were voice over internet protocol (VOIP) mean opinion score (MOS), then each VOIP call may be periodically sampled for the call quality (indicated by a MOS value). If a separate cell were also being controlled, the samples for that cell may be measured and stored in a separate or integrated datastore 204.

In one implementation, the datastore 204 may store data in the form of a histogram, where memory of the raw value of the measurement may be lost as a single bin in the histogram is incremented. One advantage of a histogram is that the control module 102 can operate on more data without impacting the datastore 204 of the system 100. Alternatively, all samples could be stored, with a bin for every possible value, although this method may require greater memory capacity.

In one implementation, the datastore 204 may store an aggregate value of each sample. Aggregate values for each sample may be, for example, the maximum measured value, the minimum measured value, and/or the average of all values.

The control module 102 may include a timer, which expires on a preset interval 206, for example every millisecond, every second, every minute, etc. When the timer expires 206, the measurements from previously stored time intervals will be consumed 208 and the datastore may then be cleared. In an alternative, the measurements may be stored for reporting purposes for a network operator. Also, measurements may be stored in some cases where the control module has multiple consumers. A single metric can apply to multiple control modules where the control modules operate in a hierarchy. For example a control module 102, which operates on a 3GPP cell, and a control module which operates on an upstream 3GPP RNC may share the same measurement since the same flow exists on both nodes.

The histogram of the measured metric is analyzed by the control module 102 and a raw measurement is extracted 210 which, in one example, represents the 80th percentile value of all of the samples that had been previously measured. Although 80th percentile is shown here as an example, any appropriate percentile, in the range from 0 to 100 may be selected. Other selection criteria may also be selected depending on the metric used, the measurements received and the shape of the histogram. The value may then be stored 212 in a memory component 214 of the control module 102.

After the raw measurement is stored, the measurement is fed to the normalization module 110, which normalizes the score 216 into a range from, for example, 0 to 100. It will be understood that other ranges may be used depending on the normalization function used. The score is then modified by the fuzzy logic module 112 such that the score becomes a fuzzified value 218.

In some cases, the QoE metric measurement may also be compared with a previous measurement stored in the control module 102. In this case, the change in value over time may be normalized then have fuzzy logic applied to the normalized value 220 by the fuzzy logic module 112.

Figure 6:
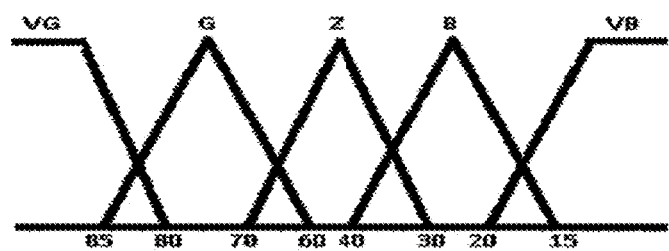
FIG. 6 is a graph showing an input fuzzy set.

In one example, the two values are analyzed 222 by the rule set module 114 using a fuzzy set $\overline{Q\&\partial Q}\in\{VG, G, Z, B, VB\}$, where, for example, $\overline{Q\&\partial Q}$ are the fuzzy values of the QoE metric and the change in the QoE metric and where the set is {Very Good, Good, Zero, Bad, Very Bad}. The set is further illustrated in FIG. 6, when the values used range between 0 and 100 and the boundaries for each element are marked. The values are analyzed by the rule set component 114, which may include determining the memberships in each set, which may be calculated based on the values of the scores relative to the boundaries of the sets. For example, a score of 65 would belong to both the G and Z sets with respective memberships. It will be understood that although the fuzzy sets in this example are shown with 5 values, using 5 triangles, other numbers of triangles, for example, 3, 7, 9 etc., may be used.

For example:
QoE (Q): Crisp value of 55, $\mu(Z)$=0.75, $\mu(G)$=0.0, else 0
$\partial$QoE ($\partial$Q): Crisp value of 65, $\mu(Z)$=0.25, $\mu(G)$=0.4, else 0

The following rule set may be applied 222 to the fuzzy inputs in order to produce a membership in the output set as shown in Table 1: First Rule Set.

TABLE 1

First Rule Set

|  |  | Q |  |  |  |  |
|---|---|---|---|---|---|---|
| ∩ |  | VB | B | Z | G | VG |
| $\partial$Q | VB | BD | BD | SD | SD | SD |
|  | B | BD | BD | SD | SD | Z |
|  | Z | SD | SD | SD | Z | Z |
|  | G | SD | SD | Z | Z | SI |
|  | VG | SD | Z | Z | SI | BI |

Each intersection in the above matrix results in an AND rule. For example, the intersection of Q and $\partial$Q, where each of Q and $\partial$Q have a score within the Z region can be expressed as the following rule:
If there is zero change in QoE ($\partial$Q is Z), AND the current QoE measurement is mediocre (Q is Z), THEN perform a slight decrease on the output (O to SD).

As in standard fuzzy theory, every single rule is applied to the fuzzy input set, and the result will be a set of memberships in the output result set $\overline{O}\in\{BD, SD, Z, SI, BI\}$ {Big Decrease, Small Decrease, Zero, Small Increase, Big Increase}.

So continuing the previous example:
Inputs from previous example:
QoE (Q): $\mu(Z)$=0.75, $\mu(G)$=0.0
$\partial$QoE ($\partial$Q): $\mu(Z)$=0.25, $\mu(G)$=0.4
Rules applied:
$\mu(Z)Q \omega \mu(Z) \partial Q$: min(0.25, 0.4)=0.25(SD)
$\mu(Z)Q \omega \mu(G) \partial Q$: min(0.75, 0.4)=0.4(Z)
Fuzzy result:
$\mu(BD)$=0.0, $\mu(SD)$=0.25, $\mu(Z)$=0.4, $\mu(SI)$=0.0, $\mu(BI)$=0.0
This fuzzy result represents that the above inputs to the system result in membership in SD of 0.25 and in Z of 0.4. According to standard fuzzy theory, the membership in all other sets would be considered 0.

Figure 7:
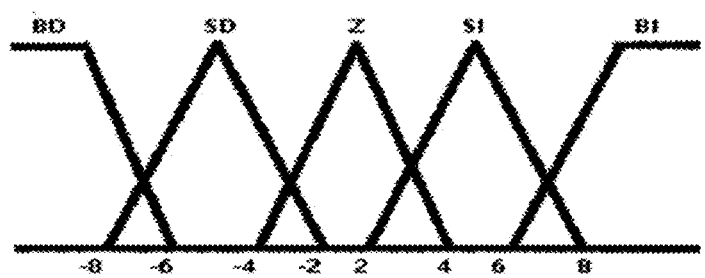
FIG. 7 is a graph showing an output fuzzy set.

The output after the application of the logic applied by the rule set component 114 will then be transmitted to the second rule set component 116 in order to be combined with outputs from previous time intervals. For example, the second rule set component 116 may combine the output with the outputs from the last two time intervals. It will be understood that more or fewer intervals could be used depending on the desired outcome. The second rule set component 116 analyzes the outputs using the output fuzzy set $\overline{O}$ with, for example, the boundaries shown in FIG. 7. The second rule set component 116 may calculate memberships in each set by determining the values of the former outputs relative to the boundaries of the sets. For example:

O(t−1): Crisp value −3.3, μ(SD)=0.43, μ(Z)=0.175, else 0

O(t−2): Crisp value=−2.2, μ(SD)=0.07, μ(Z)=0.4, else 0

The above results in 3 fuzzy sets in the $\overline{O}$ fuzzy space (input which resulted from QoE/3QoE, Output (t−1), Output (t−2)). The second rule set of table 2 can be applied 224 with the inputs. It will be understood that the rule matrix will be modified accordingly if fewer or more time intervals were used.

TABLE 2

Second Rule Set

| O(t−2) | O(t−1) | I | | | | |
|---|---|---|---|---|---|---|
| | ∩ | BD | SD | Z | SI | BI |
| BD | BD | BD | SD | SD | Z | Z |
| BD | SD | BD | SD | SD | Z | SI |
| BD | Z | SD | SD | Z | SI | SI |
| BD | SI | SD | SD | Z | SI | SI |
| BD | BI | SD | SD | Z | SI | SI |
| SD | BD | BD | SD | SD | SD | Z |
| SD | SD | BD | SD | Z | Z | SI |
| SD | Z | SD | SD | Z | SI | SI |
| SD | SI | SD | SD | Z | Z | SI |
| SD | BI | SD | Z | Z | SI | BI |
| Z | BD | BD | SD | SD | Z | SI |
| Z | SD | BD | SD | Z | Z | SI |
| Z | Z | SD | SD | SI | SI | SI |
| Z | SI | SD | Z | Z | SI | BI |
| Z | BI | SD | Z | SI | SI | BI |
| SI | BD | BD | SD | Z | Z | SI |
| SI | SD | SD | SD | Z | Z | SI |
| SI | Z | SD | SD | Z | SI | SI |
| SI | SI | SD | Z | Z | SI | BI |
| SI | BI | Z | SD | SI | SI | BI |
| BI | BD | SD | SD | Z | SI | SI |
| BI | SD | SD | SD | Z | SI | SI |
| BI | Z | SD | SD | Z | SI | SI |
| BI | SI | SD | Z | SI | SI | BI |
| BI | BI | Z | Z | SI | SI | BI |

Each intersection in the above matrix results in an AND rule. For example, the entry of O(t−1) as SI, O(t−2) as BD and I as SD can be expressed as the following rule:

If the output from 2 iterations passed was a small increase (O(t−2) is SI) AND the output from 1 iterations passed was a big decrease (O(t−2) is BD) AND the newly recommended output based on QoE and dQoE is a small decrease (I is SD), THEN output should be a small decrease (O is SD).

As in standard fuzzy theory, every single rule is applied to the fuzzy input set, and the result will be a set of memberships in the output result set $\overline{O} \in \{BD\ SD, Z, SI, BI\}$, as previously described would be the set of {Big Decrease, Small Decrease, Zero, Increase, Big Increase}, previously illustrated. For example:

Inputs:

I (from previous example): fuzzy value (μ(SD)=0.25, μ(Z)=0.4, else =0)

O(t−1): Crisp value=−3.3x, μ(SD)=0.43, μ(Z)=0.175

O(t−2): Crisp value=−2.2x, μ(SD)=0.07, μ(Z)=0.45

Rules applied:

μ(SD) O(t−2) ω μ(SD) O(t−1) ω μ(SD)I=min(0.07, 0.43, 0.25)=0.07(SD)

μ(SD) O(t−2) ω μ(SD) O(t−1) ω μ(Z)I=min(0.07, 0.43, 0.4)=0.07(Z)

μ(SD) O(t−2) ω μ(Z) O(t−1) ω μ(SD)I=min(0.07, 0.175, 0.25)=0.07(SD)

μ(SD) O(t−2) ω μ(Z) O(t−1) ω μ(Z)I=min(0.07, 0.175, 0.4)=0.07(Z)

μ(Z) O(t−2) n μ(SD) O(t−1) ω μ(SD)I=min(0.45, 0.43, 0.25)=0.25(SD)

μ(Z) O(t−2) ω μ(SD) O(t−1) ω μ(Z)I=min(0.45, 0.43, 0.4)=0.4(Z)

μ(Z) O(t−2) ω μ(Z) O(t−1) ω μ(SD)I=min(0.45, 0.175, 0.25)=0.175(SD)

μ(Z) O(t−2) ω μ(Z) O(t−1) ω μ(Z)I=min(0.45, 0.175, 0.4)=0.175(Z)

Fuzzy result:

Max(0.07, 0.07, 0.25, 0.175)=0.25SD

Max(0.07, 0.07, 0.4, 0.175)=0.4Z

Once the second rule set has been applied 224, the result may be rendered into a crisp value 226 by the logic value 118, or in other words, the value may be defuzzified to turn the aforementioned fuzzy output result into a 'crisp', discreet output which exists within the universe of discourse of the output. The input to the defuzzification process is a set of membership functions for each possible output result.

The algorithm to use for defuzzification may be the centroid method (or center of gravity). This can be computed by performing the weighted sum of the membership functions to center values. (The center value is the boundary of an output where the membership function evaluates to 1). Example:

$$\frac{\mu(X) * X_0 + \mu(Y) * Y_0 + \mu(Z) * Z_0}{\mu(X) + \mu(Y) + \mu(Z)}$$

Inputs (from previous example): 0.25SD, 0.4Z, else 0

$$\frac{\mu(BD)*BD_m + \mu(SD)*SD_m + \mu(Z)*Z_m + \mu(SI)*SI_m + \mu(BI)*BI_m}{\mu(BD) + \mu(SD) + \mu(Z) + \mu(SI) + \mu(BI)}$$

$$\frac{0*-10 + 0.25*-5 + 0.4*.0 + 0*5 + 0*10}{0 + 0.25 + 0.4 + 0 + 0}$$

Crisp value: −1.92

It will be understood that other defuzzification algorithms may be applied, for example, adaptive integration, basic defuzzification distributions, constraint decision defuzzification, extended center of area, extended quality method, fuzzy clustering defuzzification, fuzzy mean, first of maximum, generalized level set defuzzification, indexed center of gravity, influence value, last of maximum, mean of maxima, middle of maximum, quality method, random choice of maximum, semi-linear defuzzification, weighted fuzzy mean, or other defuzzification algorithms.

This crisp output value, CO(t), is then stored 228 in a memory component 230. The previous output O(t−1)

replaces O(t−2) 232 and is stored in a memory component 234 and indexed as O(t−2), as both outputs may be used during the next interval. Prior to being reintroduced to the second rule set component 116, both the crisp value of O(t−1) is translated through fuzzy logic 236 by a fuzzy logic module 122 and the crisp value of O(t−2) is translated similarly 238.

Figure 8:
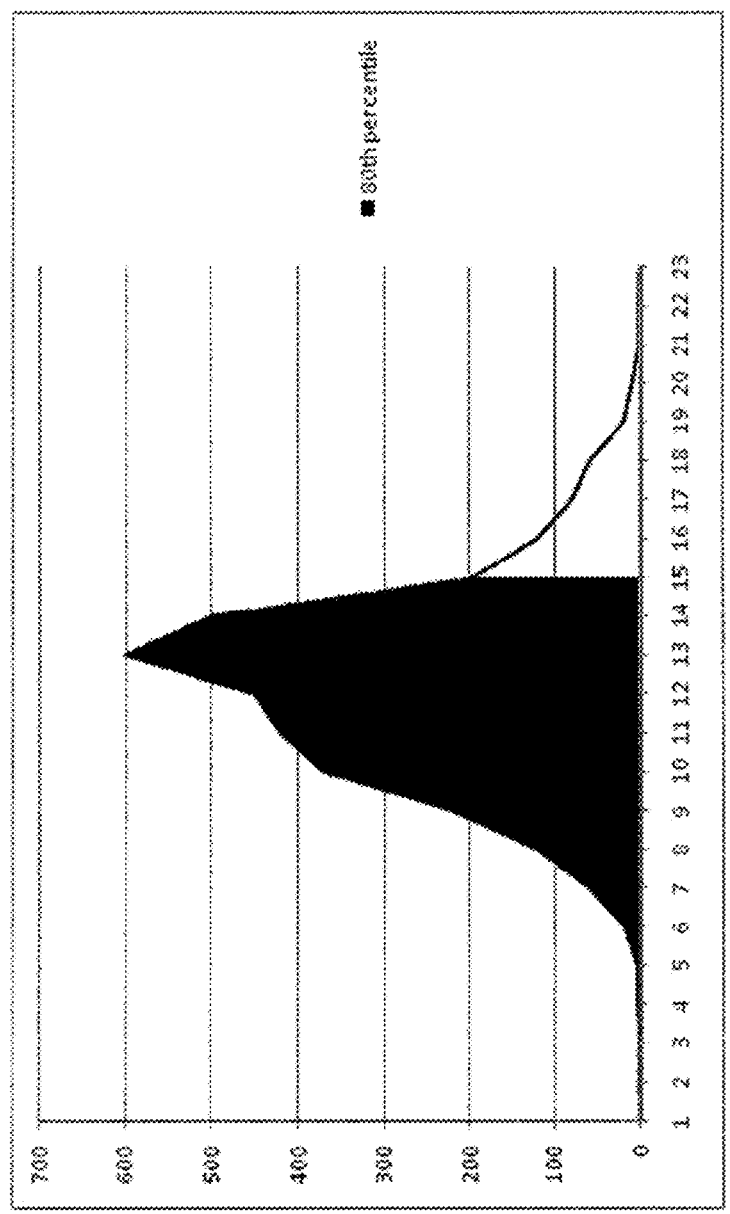
FIG. 8 is a graph showing a round trip time (RTT) distribution over controller interval.
Figure 9:
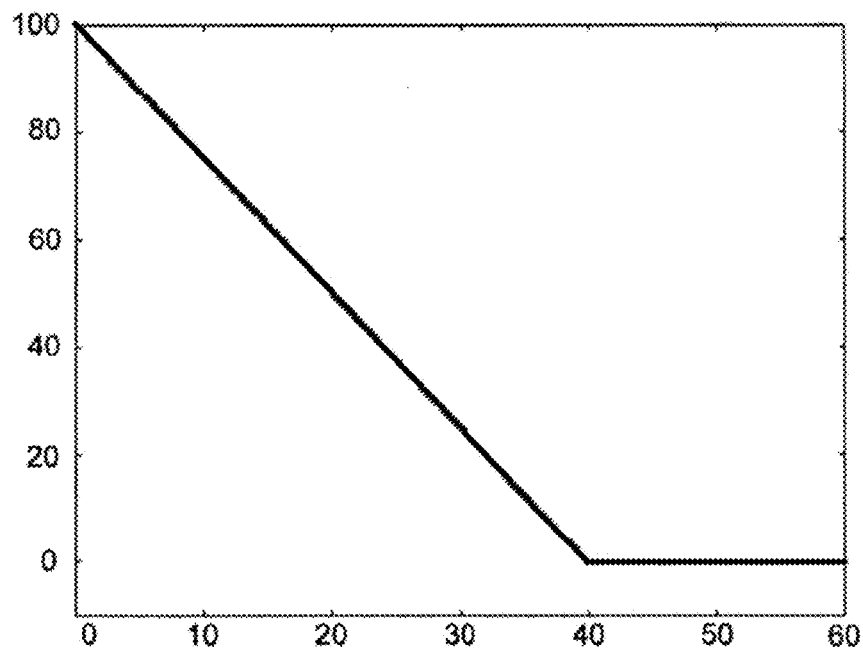
FIG. 9 is a graph showing a latency score normalization function.

In this embodiment, the crisp value output is then delivered 240 to the traffic management module 104. The traffic management module 104 then performs a traffic management action based on the desirable actions with respect to the output. In the above example, the output may have a range from −10 . . . 10 (based on boundaries of output fuzzy set), and depending on the value received, the desired traffic management action may vary as described herein. In an alternative, the control module 102 may determine the traffic management action to be applied and may transmit a signal to the traffic management module 104 to apply the traffic management action, In a specific example, the quality measurement metric input may be an aRTT sample. A histogram is created from the aRTT measurements as shown in FIG. 8. The histogram may be analyzed and a measurement may be calculated by retrieving aRTT measurements in real time at specific time intervals, for example every 5 or 10 seconds, although other time intervals could be used. FIG. 8 illustrates a crisp aRTT measurement of 15 milliseconds (ms). The retrieved value is then converted to a value ranging from 0 . . . 100 by applying a transfer function, for example, such as shown in FIG. 9.

In the case of aRTT, which is a measure of latency, optimization of the QoE metric is characterized by minimizing the aRTT value for the new traffic on the network. In FIG. 9, the X axis of the graph denotes the raw measurement value (latency in ms), and the Y axis the output score between 0 and 100. For example, a raw input value of 15 ms would yield the score of 62.5, and a raw value of 50 ms would provide a score of 0. In this manner, a latency measurement of 0 ms would indicate high quality, and any latency greater then 40 ms would indicate a low quality of experience depending on the typical latency a subscriber has come to expect in a network.

Figure 10:
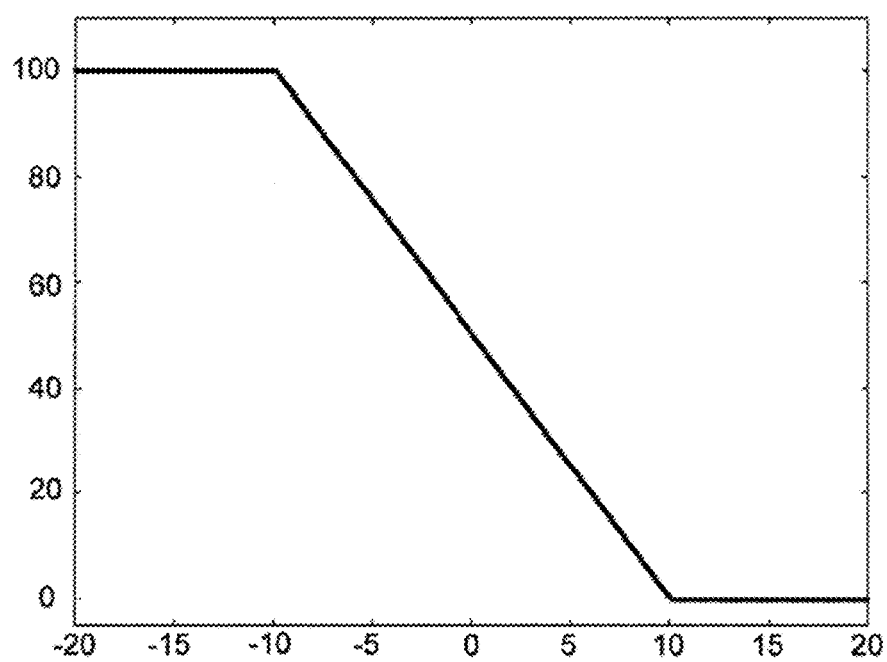
FIG. 10 is a graph showing a delta latency score normalization function.

The QoE measurement, which in this specific example is an aRTT value of 15 ms, is then compared against the last measurement reading from the control module 102, and the change in this value is also converted into a value ranging from 0 . . . 100 by applying a different transfer function such as shown in FIG. 10.

The X axis of the graph shown in FIG. 10 denotes the raw measurement value (change in latency in ms), and the Y axis the output score between 0 and 100. For example, a raw input value of 5 indicates that the 80th percentile aRTT value has increased by 5 ms over the sample interval, and would yield the score of 20, and a raw value of −5, which would indicate that the 80th percentile aRTT value decreased in latency by 5 ms over the sample interval and would provide a score of 60. In this manner, a change in latency of 10 ms decrease over the sample interval would indicate drastically increasing QoE, and any delta latency greater then 10 ms over the sample interval would indicate a significant decrease in QoE. These values from 0 . . . 100 (latency score, delta latency score) serve as the QoE measurement inputs to the control module 102 in the example where aRTT is used as a QoE measurement metric.

Figure 11:
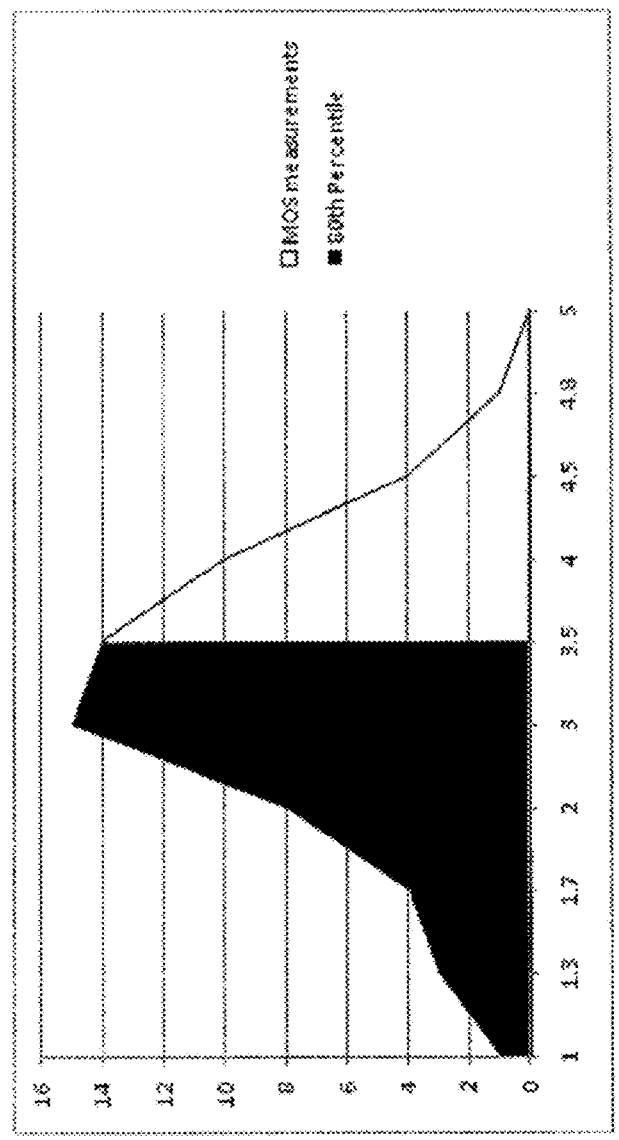
FIG. 11 is a graph showing a mean opinion score (MOS) value distribution over controller interval.
Figure 12:
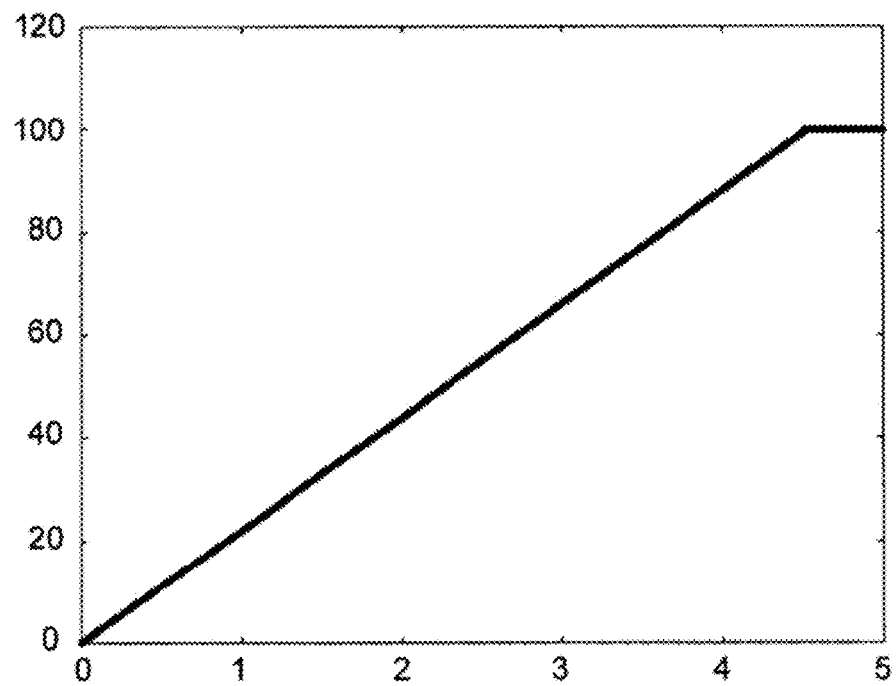
FIG. 12 is a graph showing a MOS value normalization function.

In another example, MOS values may be used as the QoE measurement metric. FIG. 11 provides an example distribution of MOS values as a QoE metric type. As in the case of aRTT, the histogram of measurement is analyzed and a raw measurement is extracted which represents, for example, the 80th % percentile value of all of the samples that had been previously measured. A similar transfer function as was used in the aRTT example may be applied to the measurement, resulting in the graph shown in FIG. 12.

Figure 13:
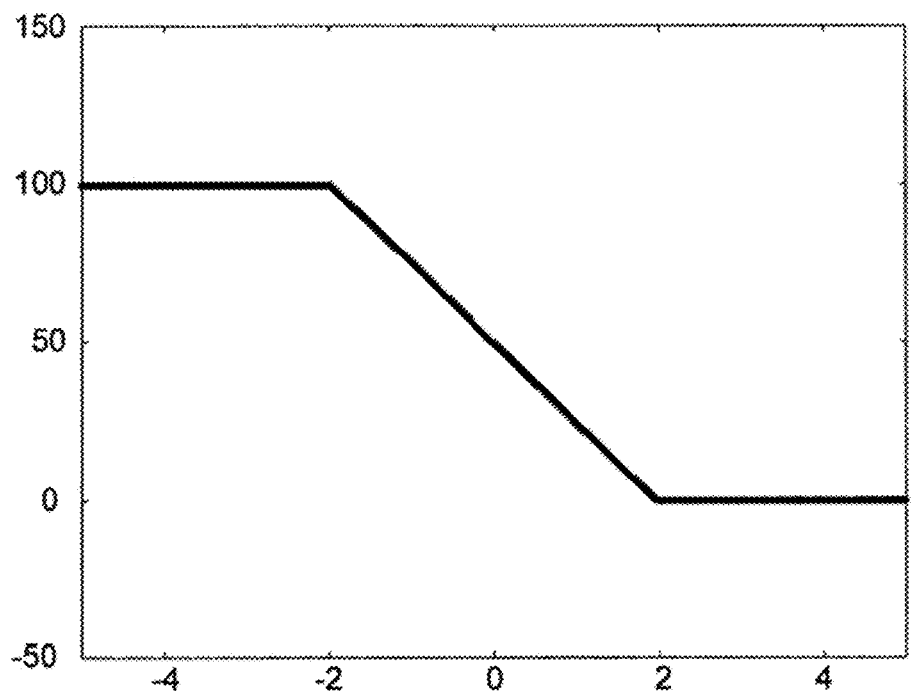
FIG. 13 is a graph showing a delta MOS value normalization function.

As in the aRTT example, the previous MOS value is compared against the current MOS value, and a normalization function is applied to the value to produce a score from 0 . . . 100, as in shown in FIG. 13. These 2 values (MOS value, delta MOS value) would serve as the QoE measurement inputs to the control module 102.

It will be understood that the system and method are not limited to the QoE metrics of aRTT and MOS values. Other QoE metrics may be measured and similar conversions may be to applied to other QoE metrics, for example, unidirectional delay, duplicate TCP ACKS, HTTP mean time to page load, HTTP mean time to page render, TCP retransmits, DNS response time, throughput of bulk transfers, ping response time, gaming jitter, gaming latency, video jitter, video QoE, speed test, 3rd party QoE measurement, or the like. The QoE measurement module 106 may measure a QoE metric at a predetermined interval and compare this measurement to a previous value obtained on the previous interval and normalize both these measurements to be used as the QoE measurement metric input to the control module 102.

As described above, once the control module 102 has analyzed the QoE measurement metrics and performed the logic on these metrics as described herein, the control module 102 transmits the output to the traffic management module 104. The traffic management module 104 will perform a desired traffic management action based on the value received. The desired actions may be predetermined and may be mapped to specific values or value ranges the traffic management module may receive from the control module. The traffic management action may be predetermined by a network operator (for example, based on a policy) and/or may include one or a combination of actions designed to manage network congestion.

The traffic management module 104 may have a variety of predetermined traffic management actions, for example:

The traffic management action could be to shape all traffic in a subscriber equal manner which is directed for the node under control. The shaper rate may be set according to the control module 102, where the control module output may be treated as a multiplier against the current shaper rate.

Example:
Current Shape Rate: 10 Mbps
Control module output: 10
New Shaper Rate: 10 Mbps+10*100 Kbps=11 Mbps The new action may be applied on the interval of the control module 102 and may continue being applied in real time until the control module 102 provides a new output.

The action could be to lower the priority of certain types of traffic based on protocol, such as real-time vs. non real-time, video vs. bulk/p2p, etc.

The action could be to reprioritize users with traffic flowing through the node, where the output of the controller indicates how heavy, and how many subscribers to affect. The selection of which subscribers to reprioritize could be based on subscriber personas (real-time vs. bulk vs. gamers), human vs. machine traffic (e.g stop lights, ATMs), heavy vs. non-heavy users, subscriber tiers, etc.

The action could be to reprioritize subscribers/traffic using PacketCable™ multimedia (PCMM) on DOCSIS 3 networks.

The action could be to reprioritize subscribers and/or traffic using Diameter Gx on a 3GPP, long term evolution (LTE) network to an inline PCEF (Policy Charging Enforcement Function).

The action could be to mark specific flows for lower priority subscribers and/or traffic flows for downstream enforcement.

The action could be to change bearer priorities for flows for reprioritized subscribers and/or traffic flows.

The action could be to perform tunnel endpoint identifier (TEID) rewrites for flows for deprioritized subscribers/flows.

It will be understood that any of various traffic management methods, now known or hereafter developed, may be applied using the system 100 and method 200.

In some cases, multiple instances of the traffic management system 100 may be used in order to control multiple traffic flows passing over a single link. The control module 102 may include a classification module which may use traffic classification to associate traffic flows with a correct instance. For example, classification by location could be accomplished by making the system 100 "subscriber aware", for example, where the location of the subscriber is fed to the system 100 through a specific subscriber attribute. The subscriber attribute may be stored in the subscriber database 101. The subscriber attribute may represent, for example, the subscribers location, such as which CMTS the subscriber is connected to (in a Cable network), the DSLAM the subscriber is connected to (in a DSL network), under which Cell/Node B/RNC the subscriber is connected (in a 3GPP wireless network), or the like. It will be understood that the traffic management system may also act based on other subscriber attributes available in the subscriber database 101.

The classification may be based on, for example, the destination cell of a mobile network; the destination Node B of a mobile network; the destination RNC of a 3GPP mobile network; the destination SGSN of a 3GPP mobile network; the destination quadrature amplitude modulation (QAM) of a cable network; the destination DSLAM of a DSL network, the protocol (e.g. L3, L4, and application protocol type) or the like. The method, similar to the method described above, may be applied in parallel and independently for each destination.

In some cases, the traffic management system and method may include data storage for storing the various data used in the system and method for future reference, for example, for auditing purposes.

Conventional traffic management systems generally work by limiting the bandwidth available to users for certain types of traffic, to improve the overall QoE of the users. In some cases, traffic management systems are able to provide for a dynamic control system which is intended to only limit the bandwidth when QoE has been shown or proven to be bad. However when such a solution is deployed in the real world, especially in wireless networks and heterogeneous networks where more than one access technology is used, the solution may become costly and cumbersome to maintain, as the parameters and boundaries within a network may differ.

The "one size fits all" conventional solution may be beneficial for some access network locations and not work at all for other access network locations. For example, consider a traffic management solution deployed on a 4G (LTE) network where the cells can be of different hardware specifications. The parameters used to measure cell QoE such as latency benchmarks would be different for different types of cells. Furthermore, consider a heterogeneous network where multiple access technologies are used in tandem, for example, both 3G (UMTS) and 4G (LTE) cells of varying hardware specification may be part of the same network and the definition of what qualifies as good QoE and bad QoE on these cells will generally be very different. As such, the applicant has determined that applying the same yardstick to calculate QoE and manage traffic based on that QoE across such access network locations may be a problem.

Generally, in embodiments described herein, there is provided a traffic management system and method where the QoE calculation is heuristically calibrated on a per network access location level, the system is intended to learn about the network from traffic patterns and uses this knowledge to manage traffic across different access network locations advantageously.

It is intended that the system for heuristic control of traffic management learns about the network from traffic patterns on the network and uses this knowledge to calculate quality of experience (QoE) and manage traffic across different access network locations. The QoE measurement module of the traffic management system is configured to extrapolate QoE trends seen from each access network location to arrive at the favourable parameters for managing the traffic at that access network location. These parameters are then used by the control system module to determine what traffic management action may need to be applied to achieve favourable QoE at a particular access network location; the traffic management module subsequently applies the traffic management action to the network traffic. The system is intended to automatically calibrate to any changes in the network without requiring manual intervention. Embodiments of the system detailed herein are intended to allow network operators to manage heterogeneous networks and networks with disparate access network locations in a cost effective and improved manner.

A telecommunications network consists of a large number of access end points or access network locations. An access network location might be defined as an entity to which subscriber devices are connecting to for network access, for example, Internet access. Depending on the access technology in use, an access network location can be, for example, a nodeB or an eNodeB, a base transceiver station (BTS), or the like. In large networks the number of such access network locations might run into thousands and even hundreds of thousands. Generally speaking, access network locations are not equal; there might be a variety of factors which differentiate them. Some of these factors are detailed herein while others will be understood by those skilled in the art.

Acknowledging the fact that access network locations are different, it is implied that QoE calculation for all access network locations may not follow the same method, what qualifies as a good QoE measurement for one access network location might not be considered a good QoE measurement for another access network location. Manually configuring the QoE calculation method for each access network location in a network containing thousands of such locations or more is a costly process which consumes time and effort and is generally not performed for these and other reasons, and as networks are not static and change frequently, it is generally considered to update the QoE calculation method continuously.

Unlike conventional universally applied QoE rules, embodiments of the system for heuristic control of traffic management herein are configured to act automatically to calculate the appropriate method of QoE calculation for each access network location. After the initial deployment of the system, there is intended to be no user intervention required at all to ensure that the system is calculating favourable QoE measurements for each access network location.

Figure 14:
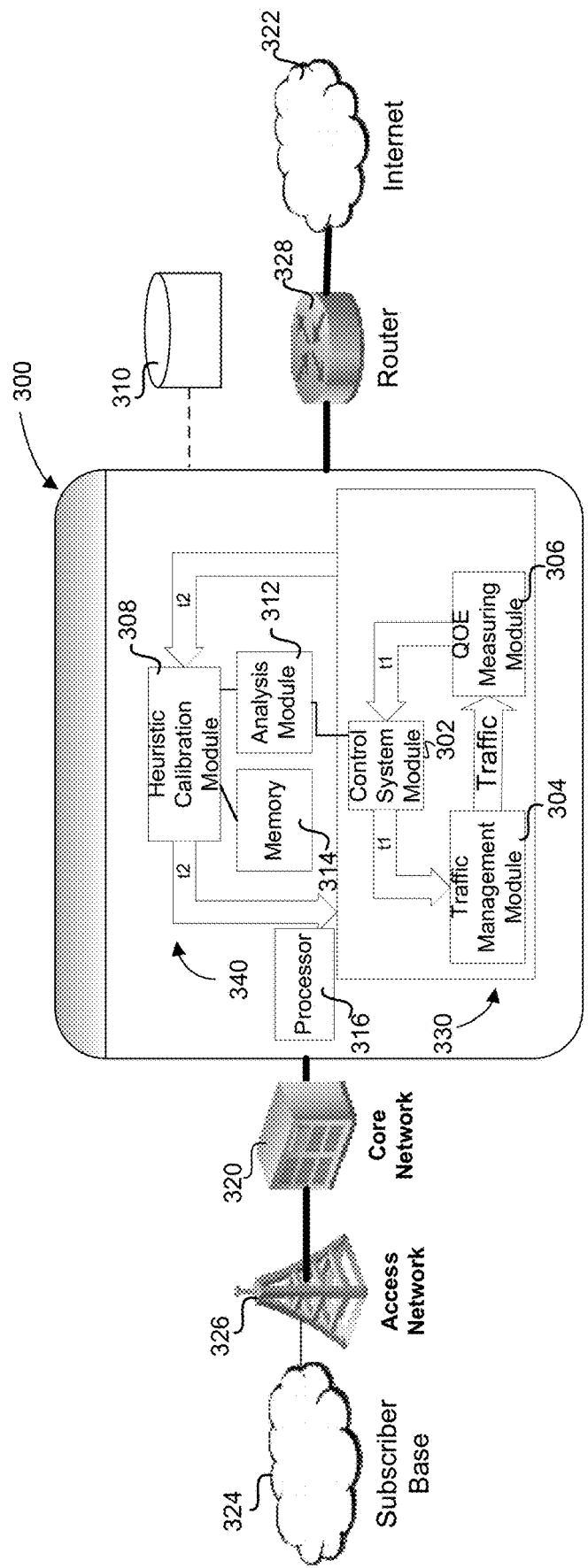
FIG. 14 illustrates an embodiment of a system for heuristic control of traffic management.

FIG. 14 illustrates an embodiment of a system 300 for heuristic control for traffic management according to an embodiment. The system 300 includes a control system module 302, a traffic management module 304, a QoE measurement module 306, a heuristic calibration module 308, an analysis module 312 and a memory module 314. The system 300 is intended to be operatively connected to a core network 320 in order to intercept or otherwise review traffic being transmitted to and from the core network 320. The system 300 is also intended to be operatively connected to at least one database 310 configured to store data related to the network traffic and the measured QoE metrics.

It is intended that the system 300 for heuristic control for traffic management be included into a network, for example, an internet service provider's network. The system 300 may generally be located between the core network 320 and the Internet 322, via, for example, a router 328. The core network 320 may be operatively connected with an access network 326 which provides access to the Internet to a subscriber base 324.

The system 300 may include two control loops 330 and 340. A traffic management control loop 330 (sometimes referred to as a first control loop) includes the control system module 302, the traffic management module 304 and the QoE measurement module 306. A heuristic control loop 340 (sometimes referred to as a second control loop) includes the heuristic calibration module 308 as detailed herein. The two control loops are intended to work on different time scales, denoted by $t_1$ and $t_2$ respectively.

The QoE measurement module 306 examines subscriber traffic and calculates QoE scores. The metrics used to calculate QoE scores can be configured by the operator. Metric values are calculated per access network location by inspecting traffic flows. The QoE score is fed as input into the control system module 302 which decides what action, if any, may be taken to improve the QoE of an access network location and communicates this action to the traffic management module 304. The traffic management module 304, performs the traffic management action, for example, the traffic management module 304 may limit the bandwidth of selected traffic flows based on the operator configuration to improve the QoE of the access network location. The time scale, $t_1$, at which the traffic management loop functions is configurable, but generally is intended to be in the order of seconds or better rather than hours as the traffic management action is intended to be more relevant and achieves better results if the action is performed at or close to real time.

The analysis module 312 is configured to receive QoE measurements from the QoE measurement module 306. The analysis module 312 is configured to analyze the received QoE measurements, and generate aggregated results of the measurements by creating, for example, a histogram.

The heuristic control loop 340 is an second control loop which contains the heuristic calibration module 308. The heuristic calibration module 308 learns from the traffic passing through the system 300 what are beneficial QoE measurement benchmarks in each access network location, in order to provide optimization to the QoE measurement via the QoE measurement benchmarks. The heuristic calibration module 308 retrieves historical data from, for example, a database 310. The historical data may be retrieved for each access network location to understand what are the most relevant characteristics of that location. The heuristic calibration module 308 may include or may be operatively connect to a memory module 314 configured to store data related to the analysis of the QoE measurements as detailed herein.

The system 300 is intended to create a balance between considering a too smallest of historical data and a too large set of historical data. As such, the interval $t_2$ for performing the heuristic control loop 340 can be set appropriately. If the interval $t_2$ is too low, the frequent calibration may cause the system to adapt with minor variations instead of managing the network based on a valid benchmark. If the interval is too large, the delayed calibration may be too slow to react to changes in the network. In some cases, the interval may be approximately 24 hours as this interval is intended adapt the QoE measurement benchmarks within a maximum of 24 hours from the change being made.

The historical data can be used to calibrate any of the multiple configuration parameters of the traffic management control loop 330. The network traffic is intended to be input for the heuristic calibration module 308, where the data is stored for the configured interval. At the end of the calibration interval, the historical data is used to determine calibrated configuration parameters. For example, the heuristic calibration module 308 is configured to determine, for each metric, at least one metric benchmark which may include, for example, a positive benchmark, a positive and negative benchmark, a threshold benchmark, a tolerance benchmark, or the like, against which the metric value is measured to determine the quality of the QoE of each access network location. A positive benchmark is a measure of an ideal metric value (for example, a perfect QoE) while A negative benchmark is a measure of a worst metric value (for example, a zero QoE).

In an example, the negative benchmark, or zero score benchmark, is the measure of QoE metric at which point the QoE score is determined to be the absolute worst, or zero. If the QoE metric crosses this threshold and continues to degrade, it is unlikely to make much difference to the consumer as the QoE is likely to be beyond tolerable user experience. The negative benchmark can also be heuristically calibrated by the heuristic calibration module 308. If the network has had a hardware or system upgrade, the negative benchmark value may be heuristically calibrated to be different than prior to the upgrade. This would mean that a QoE metric value which before the link replacement was evaluated as an average QoE or a below average but not zero QoE could after the link replacement be evaluated as zero QoE. This is the desired outcome, as the network capability has evidently improved and what constitutes the absolute worst QoE score in the network has also changed.

In an example implementation of the system 300, the heuristic calibration module 308 may be used to calibrate two metric benchmarks every interval $t_2$, for example, every hour, every 12 hours, every 24 hours, every week, or the like. Traffic from a particular network access location is used to calculate metric values, and from a heuristic analysis of the metric values over time ($t_2$), the heuristic calibration module 308 is able to calculate the optimal positive and negative benchmarks for that location. If current metric benchmarks being used by the traffic management control loop 330 differ from the newly calculated metric benchmarks, then the heuristic calibration module 308 automatically calibrates the traffic management control loop 330 to use the newly calculated metric benchmarks.

The system 300 further includes the processor 316. The processor 316 may be in the control system 302 module and is configured to execute instructions from the other modules of the system 300. In some cases, the processor may be a central processing unit. In other cases, each module may include or be operatively connected to a separate processor.

Figure 15:
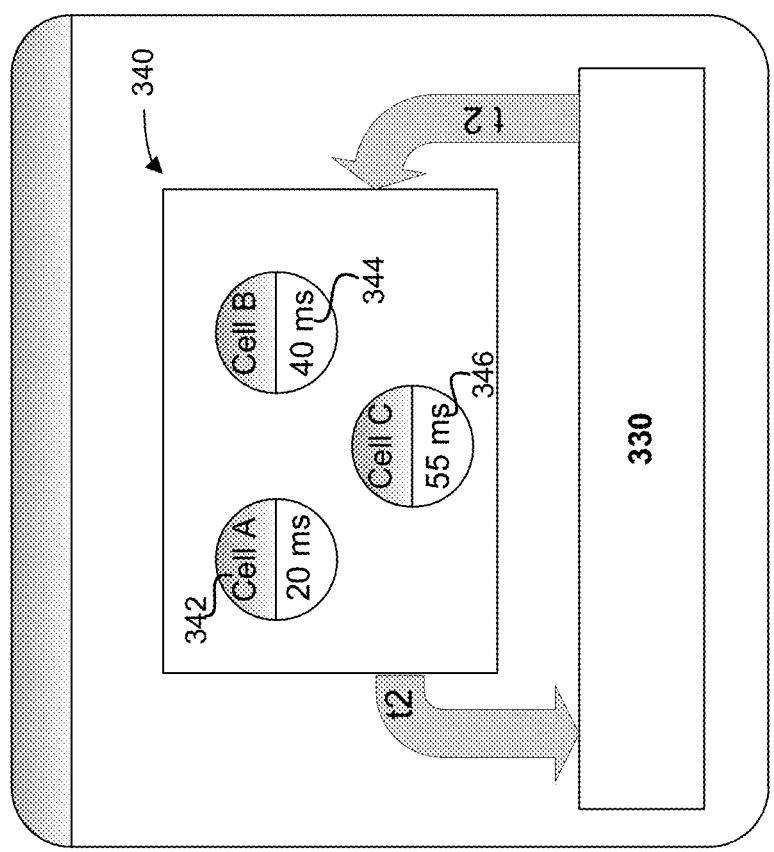
FIG. 15 illustrates an example process for heuristic control of traffic management for three cells.

FIG. 15 illustrates an example process by which the heuristic calibration module 308 may identify metric benchmarks for three cells, Cell A 342, Cell B 344 and Cell C 346, and through the benchmarks for the cells, a method to calculate QoE on a per access network location basis.

The QoE measurement module 306 in the first control loop 330 uses one or more metrics to calculate the QoE. In this example, there are three access network locations for the traffic management system to manage and access round trip time (aRTT) as the metric to calculate QoE score. aRTT is defined as the measure of time from when a packet enters the network operator's access network to when the response packet leaves the access network via the same point. Specifically, aRTT is the measure of time between the SYN-ACK and ACK packets on a TCP flow when the subscriber is the client of a TCP connection. The smaller the aRTT value, the better the quality of the link; the larger the aRTT value, the worse the quality of the link.

In this example, the best metric values in this case are the smallest aRTT values seen over the course of a day by a particular access network location. An access network location sees traffic throughout the day with varying aRTT values. The aRTT values seen by the access network location during the peak hours are generally higher than at other times due to bandwidth congestion and the aRTT values seen during the off peak hours when the access network is less likely to be congested are aRTT values that the access network location is physically capable of achieving. It will be understood that the system and method detailed herein may use other QoE metrics, for example Mean opinion score (MOS), HTTP mean time to page load, HTTP mean time to page render, TCP retransmits, DNS response time, ping response time, video QoE, video jitter, gaming jitter, gaming latency, speed test, 3rd party QoE measurement, or the like.

In this example, the interval for the heuristic control module 308 to recalibrate the QoE measurement module 306 is 24 hours ($t_2$=24 hours) and that the first control loop 330 executes a loop every minute ($t_1$=60 seconds). Traffic from the three locations are continuously inspected by the traffic management system 300 and an aRTT value of each TCP flow may be determined. After the end of 60 seconds, a representative aRTT of each location for that interval is calculated and this value may be compared against the positive and negative metric benchmarks to calculate the QoE score of each location in that 60 second interval. Note that when first deployed, the metric benchmarks may be common for all three locations, for example, via a default metric benchmark.

In this example, the positive benchmark value may be a default of 55 milliseconds (ms) and the negative benchmark value may be 100 ms for all three locations. The system 300 determines that the QoE metric value (the aRTT value) is 50 ms for Cell A 342, 55 ms for Cell B 344 and 40 ms for Cell C 346. As such, the results would be as follows:
   Cell A: Measured aRTT value=50 ms, Positive Benchmark=55 ms=>Perfect QoE score
   Cell B: Measured aRTT value=55 ms, Positive Benchmark=55 ms=>Perfect QoE score
   Cell C: Measured aRTT value=40 ms, Positive Benchmark=55 ms=>Perfect QoE score These results would imply that all access network locations may be considered to have perfect QoE (in this context, "perfect" indicates mathich or exceeding the benchmark) and no traffic management action needs to be taken to further improve the QoE.

Over the next 24 hours (recalibration interval of $t_2$), after each 60 second period ($t_1$) metric values for each access location are stored in a data store, for example in the at least one database 310, and may be retrieved by the heuristic calibration module 308. At the end of the 24 hour the best metric values scores are used to determine what the best achievable metric value (or aRTT value) is for each particular access network location. In this example, it can be assumed that at the end of 24 hours the following results are calculated:
   Positive benchmark (in milliseconds) for each location
   Cell A: 50 ms;
   Cell B: 40 ms; and
   Cell C: 25 ms.

This information is then used to re-calibrate the traffic management control loop 330, and, in particular, the QoE measurement module 306 which uses the information to calculate the QoE scores for the cell going forward. If the same measured aRTT value are used as before, the outcome will be different for each cell as each cell now has different positive benchmarks.
   Cell A: Measured aRTT value=50 ms, Positive Benchmark=50 ms=>Perfect QoE score
   Cell B: Measured aRTT value=55 ms, Positive Benchmark=40 ms=>Good QoE score
   Cell C: Measured aRTT value=40 ms, Positive Benchmark=25 ms=>Average QoE score The same measured metric values (aRTT measurements) as before evaluate to radically different QoE scores. The heuristic calibration method has re-defined how good QoE was defined for each location. This process is intended to be repeated every calibration interval. It will be understood that a similar process may be used with a negative or other benchmark.

Figure 16:
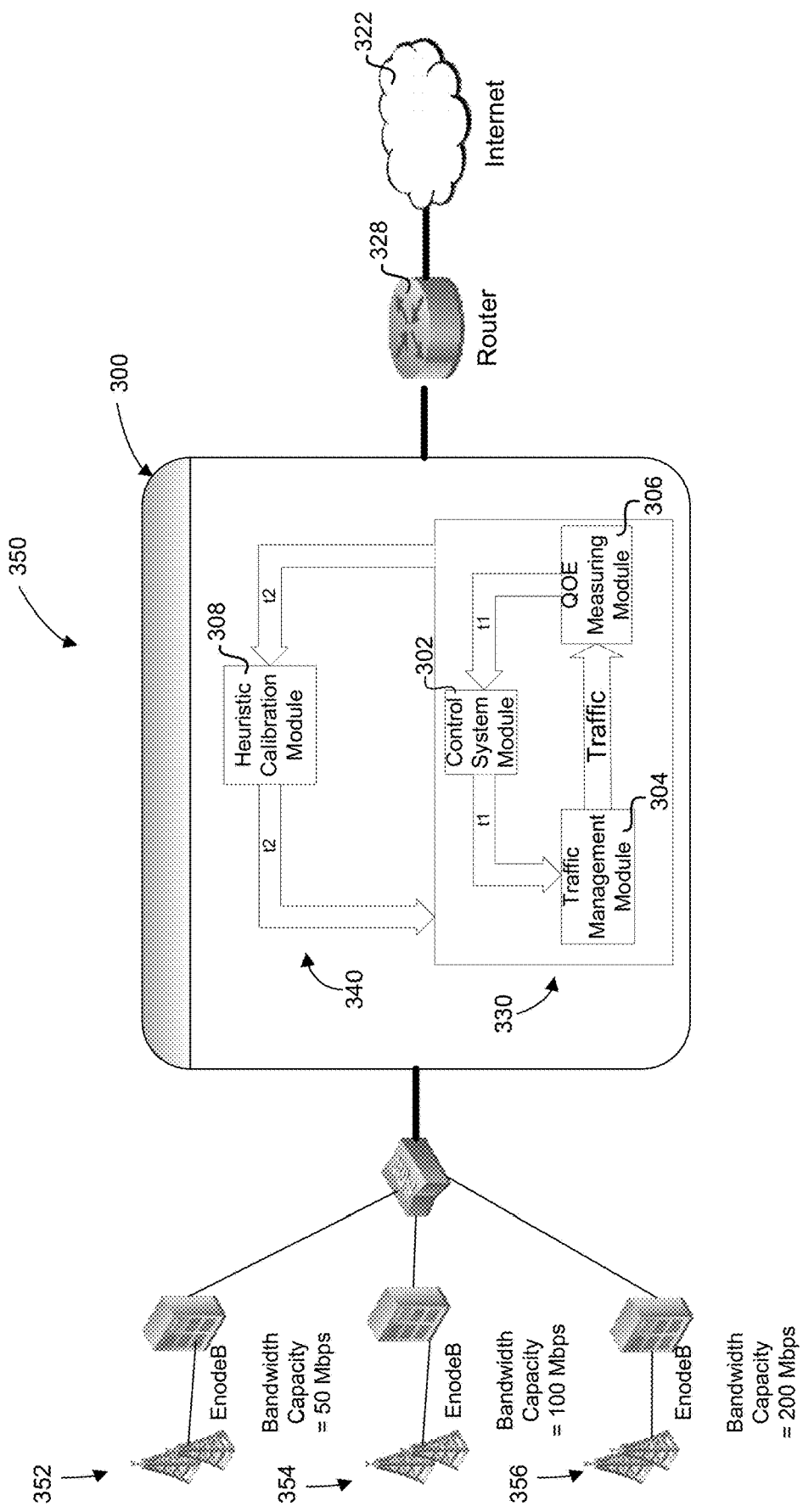
FIG. 16 illustrates an embodiment of the system for heuristic control of traffic management in a 4G-LTE network.

FIG. 16 illustrates a 4G-LTE network 350, where the access network locations or cells may be comprised of different hardware specifications, for example, different vendor equipment, different frequency spectrum used in a network device, or the like. Generally, in LTE networks, the frequency spectrum used in the device determines the bit rate the device will support. A device that supports 1.25 MHz and a device that supports 20 MHz would in effect work differently and support different bit rates, and would likely benefit from different calibrated configuration parameters for QoE calculations. The total bandwidth capacity achievable by each cell is different. In the example, it is assumed that Cell 1 352 has a bandwidth capacity of 50 megabits per second (Mbps), Cell 2 354 has a bandwidth capacity of 100 Mbps, and Cell 3 356 has a bandwidth capacity of 200 Mbps. How good and bad QoE is defined for each of these cells is very different as each cell is limited by its physical capacity. For example, what may be considered bad QoE for the Cell 3 356, the 200 Mbps cell might be average or good QoE for the Cell 1 352, the 50 Mbps cell. The method of measuring QoE across such disparate cells should be different, because, if not the results will be accurate for some cells and inaccurate for others. For a more specific example, consider the metric being used to calculate QoE is once again access round trip time (aRTT).

Cell 1: Bandwidth capacity=50 Mbps, Measured aRTT value=75 ms

Cell 2: Bandwidth capacity=100 Mbps, Measured aRTT value=40 ms

Cell 3: Bandwidth capacity=200 Mbps, Measured aRTT value=35 ms

In the above example considering Cell 1 352 to be representative of the network, where a positive benchmark has been considered to be 50 ms and the negative benchmark 100 ms. So a measured aRTT value of 75 ms on Cell 1 352 would qualify as an average score. The same benchmarks applied to Cell 2 354 and Cell 3 356 would give a perfect scores for their measured aRTT values. But the measured aRTT value of 35 ms might not be a perfect score or even a good score for a cell which has the bandwidth capacity of Cell 3 356.

If Cell 3 356 is considered as the representative cell, the system would have run into similar problems. Plus, it is possible that sometime during the network's operation Cell 2 354 may be replaced with a newer cell which has a bandwidth capacity of 150 Mbps, such that any configuration previously applied will now be out of date.

The system 300 for heuristic control of traffic management is intended to handle this type of scenario without the need for manual intervention. During initial deployment a set of default values may be chosen, for example Cell 1 352 may be considered to be representative of the network and benchmarks of 50 ms and 100 ms may be applied, in this example. The QoE measurement module 306 uses these values to calculate QoE scores and may store these values in a database to be retrieved by the heuristic calibration module 308 along with the metric values, which, in this example, are the aRTT values for each of the cells. The control system module 302 may also maintain or store the metric values for each cell over a period of time, and, using this data store, the heuristic calibration module 308 determines the best achievable metric value for this particular cell. The worst metric values exhibited by the cell can also be measured in a similar method. Using this method the benchmark(s) of each cell are recalibrated by the heuristic calibration module 308. The new recalibrated benchmarks are then fed back to the QoE measurement module 306 which uses the new benchmarks to calculate more meaningful QoE scores.

Using the above example, after performing the heuristic control loop with respect to each of the three cells, the default positive benchmark of 50 ms may be amended to a recalibrated positive benchmark which would be more appropriate to each of the three cells in the example.

Cell 1: Bandwidth capacity=50 Mbps, Measured aRTT value=75 ms, Recalibrated Positive benchmark=50 ms Cell 2: Bandwidth capacity=100 Mbps, Measured aRTT value=40 ms, Recalibrated Positive benchmark=30 ms Cell 3: Bandwidth capacity=200 Mbps, Measured aRTT value=35 ms, Recalibrated Positive benchmark=10 ms Further, if Cell 2 354 is replaced with a newer cell with bandwidth capacity equal to 150 Mbps then the system 300 is configured to automatically calibrate the metric benchmarks for that particular cell.

Figure 17:
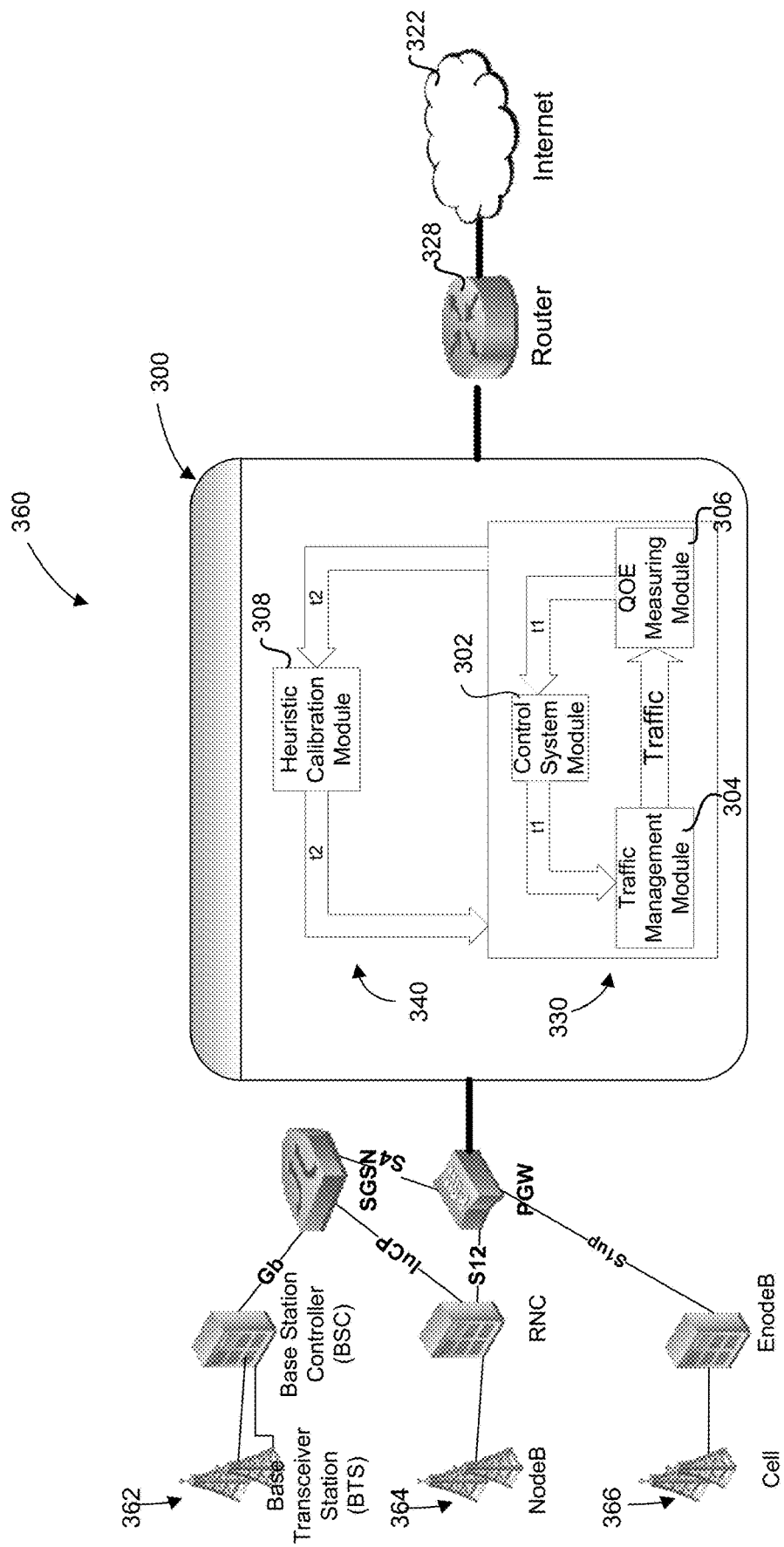
FIG. 17 illustrates an embodiment of the system for heuristic control of traffic management in a heterogeneous network.

Cell 1: Bandwidth capacity=50 Mbps, Measured aRTT value=75 ms, Recalibrated Positive benchmark=50 ms Cell 2: Bandwidth capacity=150 Mbps, Measured aRTT value=40 ms, New Recalibrated Positive benchmark=20 ms Cell 3: Bandwidth capacity=200 Mbps, Measured aRTT value=35 ms, Recalibrated Positive benchmark=10 ms FIG. 17 illustrates a heterogeneous network 360 where a 2G(GSM) cell 362, a 3G(UMTS) cell 364 and a 4G(LTE) cell 366 exist as part of one network. The system 300 for heuristic control of traffic management is intended to be advantageous in such heterogeneous networks, and is intended to require minimal user interaction. Initially, each cell may be assigned appropriate benchmark metric values based on the access technology in use. Thereafter, recalibrations are intended to fine tune the benchmarks and also adapt the benchmarks to any changes or upgrades in the network configuration. In this example, the QoE metric is HTTP mean time to page load.

Figure 18:
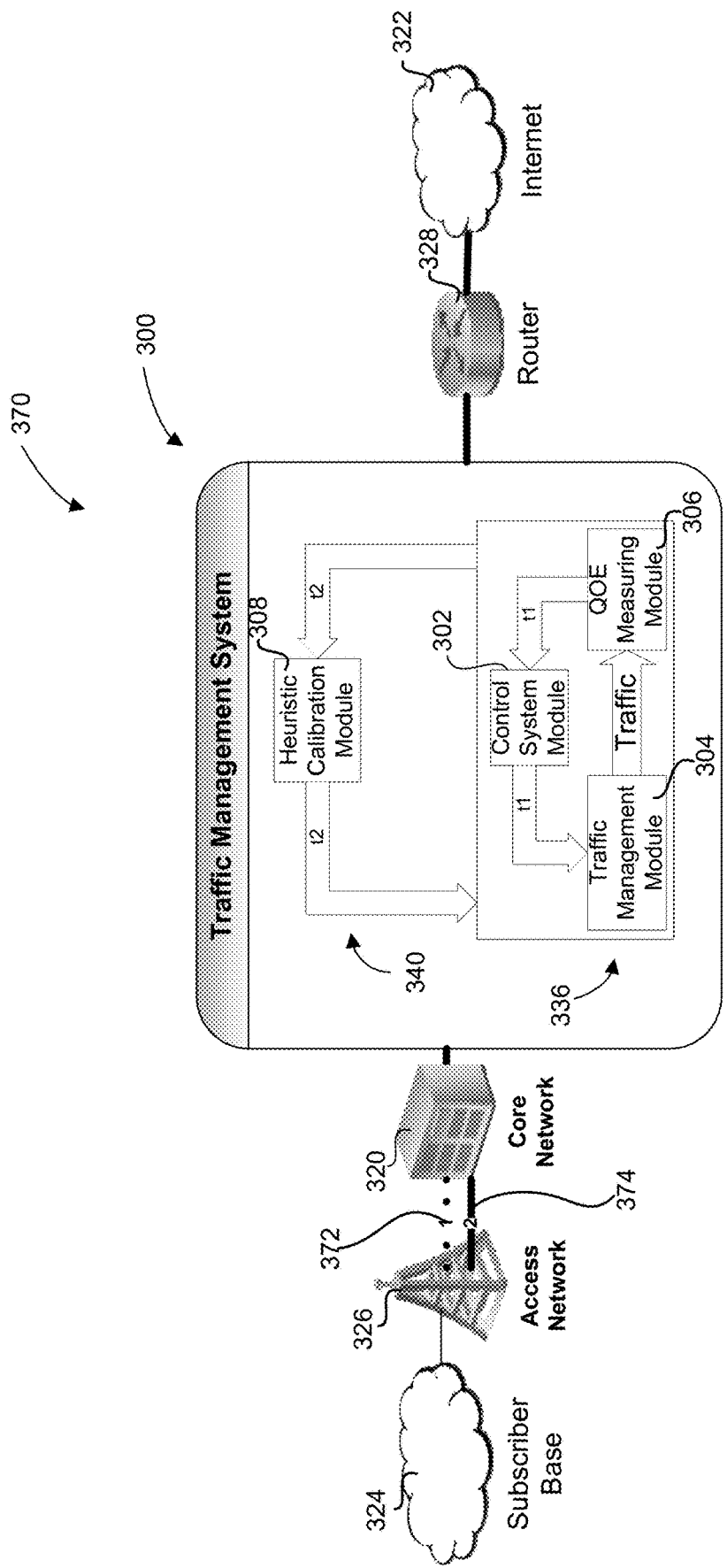
FIG. 18 illustrates an embodiment of the system for heuristic control of traffic management in a network with a fiber backhaul link replacement.

2G cell, measured HTTP mean time to page load T value=200 ms, Positive benchmark=50 ms, Recalibrated Positive benchmark=100 ms 3G cell, measured HTTP mean time to page load value=75 ms, Positive benchmark=50 ms, Recalibrated Positive benchmark=50 ms 4G cell, measured HTTP mean time to page load value=15 ms, Positive benchmark=50 ms, Recalibrated Positive benchmark=10 ms FIG. 18 illustrates a network 370 where a fiber backhaul link between the access network 326 and the core network 320 is changed during a maintenance activity by the internet service provider. The dotted line 372 indicates an original fiber link to the core network 322 which was a 10 gigabits per second (Gbps) link, the solid line 374 indicates the newly laid fiber link which is a 25 Gbps link.

Before maintenance: Measured aRTT value=50 ms, Calibrated Positive benchmark=50 ms, Perfect QoE score After maintenance: Measured aRTT value=50 ms, Recalibrated Positive benchmark=20 ms, Below average QoE score In some of the examples detailed here, a measured aRTT value is intended to be a random sampling aRTT value. In this example, over a historical interval, for example, 24 hours, the heuristic calibration module 308 analyzed the network traffic and found the best aRTT this particular access location could perform (lowest aRTT the location could achieve) was 20 ms, whereas the previous calibrated value (with original fiber link) was 50 ms (which implies that the lowest aRTT the location could achieve with the original fiber link was 50 ms). In a quality evaluation interval (the first control loop) the system 300 detects the location to have an aRTT of 50 ms—with the original positive benchmark this equated to a perfect QoE score, but now that the fiber link has improved and since the system has re-calibrated the positive benchmark to be 20 ms, the QoE score is actually below average. This implies that, with the updated physical hardware, the measured aRTT is not good enough, and that the traffic management module 304 has the potential to provide further traffic management action to further improve the QoE.

It will be understood that the system and method are not limited to heuristically calibrating the positive benchmark. Other parameters of the traffic management control loop 330 such as negative benchmark, minimum samples which are required to make a valid aRTT sampling, or the like may also be calibrated using the system 300. The minimum samples parameter may, for example, define how many aRTT measurements or other metric measurements, the system 300 receives for a particular network access location in $t_1$ (60 seconds) for the resultant metric value and QoE score to be representative of the network access location. It is intended that the method for heuristic control of traffic management allows for any of various configurable parameters to be heuristically calibrated.

Figure 19:
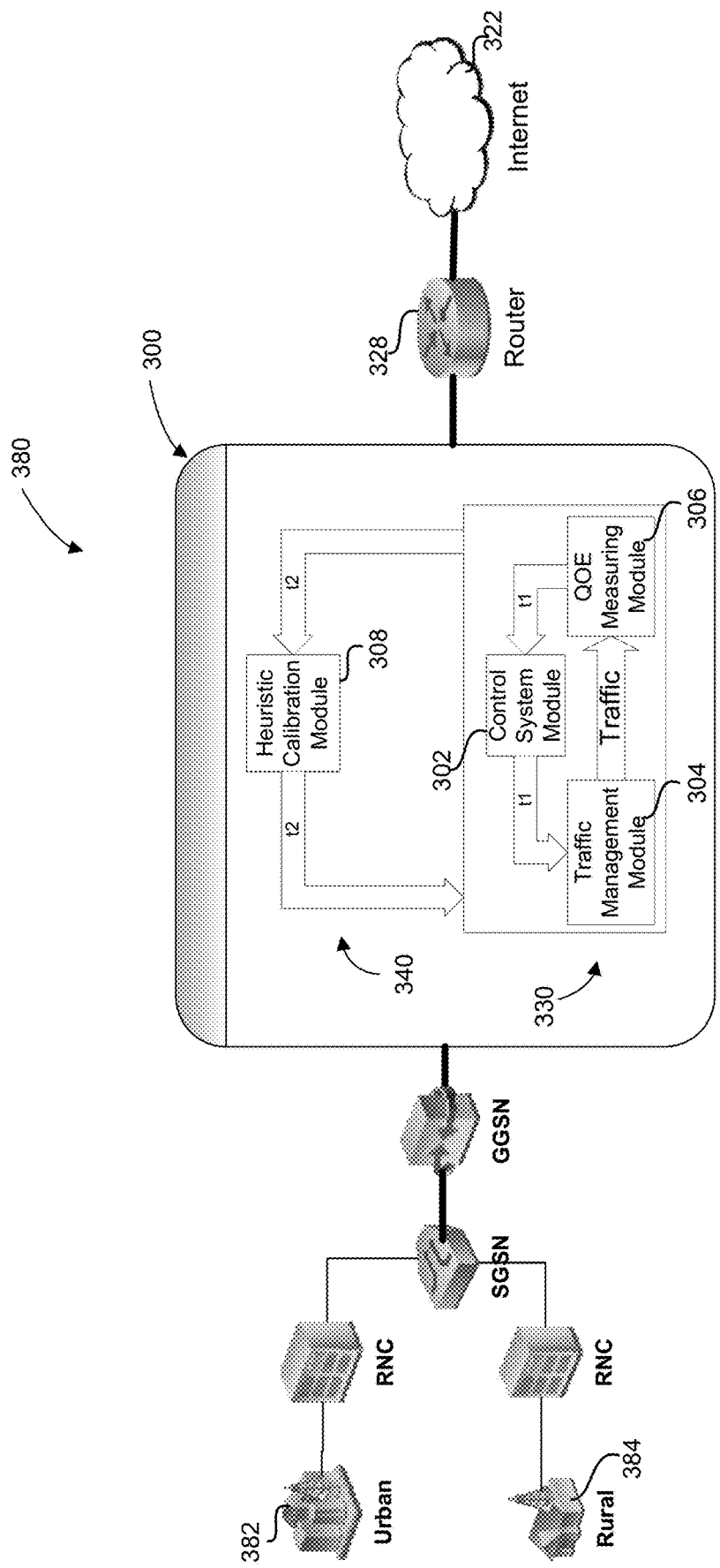
FIG. 19 illustrates an embodiment of the system for heuristic control of traffic management in a 3G-UMTS network.

FIG. 19 illustrates a 3G-UMTS network 380 where the nodeBs are deployed across locations of different characteristics. One cell 382 is deployed in an urban area with a high population density and a large number of subscribers, another cell 384 is deployed in a rural area with a low population density and a sparse subscriber base. The internet service provider could decide to deploy different capacity cells in urban and rural areas, or deploy similar cells. In either case, the method of QoE calculation for both cells may not be optimal if the same method is used for both cells.

Considering the case where the urban and rural cells have different bandwidth capacity, the system 300 may act on the cells as follows:

Urban cell, Default minimum samples=20, Recalibrated minimum samples=100

Rural cell, Default minimum samples=20, Recalibrated minimum samples=10

Including a minimum sample threshold may be used for many reasons. First, in the cases where the timing of $t_1$ or $t_2$ do not change. The intervals remain the same, but the calibrated minimum samples threshold decides whether a particular $t_1$ interval will be considered valid or not. For a sample to be considered valid it implies that the sample could potentially lead to a traffic management action or not. In this example, if in an urban cell over the $t_1$ interval 50 samples of the QoE metric are received then that value is below the recalibrated minimum samples—which is intended to imply that the sampling is too low for it to be a reasonable representation of the cell. But for a rural cell which is expected to get a sparse sampling, 50 samples of QoE metric over the same $t_1$ interval is intended to provide a good representation of the cell and is considered a valid sampling. Second, the calibrated minimum samples could be used to modify the $t_1$ interval to ensure that the algorithm uses an interval where a representative number of samples might be observed.

The system 300 may also include predetermined boundaries on certain conditions to ensure that the automatic heuristic calibration does not result in unrealistic benchmarks and methods of calculating QoE. Further, the system 300 is also configured to avoid recalibration too frequently leading to potential performance implications or unstable control.

If recalibration is done too frequently, it may affect the stability of the system 300. For example, the system 300 would potentially adapt itself to minute fluctuations of the network instead of working on a broader representation of the network. The downside for too frequent recalibration is that the calibrated configuration parameters would not calculate the QoE optimally, instead the system 300 might keep changing the method used to calculate the QoE score and possibly lead to inconsistent QoE score trends. For example, the trends could be up a second, down the next and back again, etc. When the method for heuristic control of traffic management is applied to a large distributed system where each traffic management action is applied across multiple machines and modules—frequent changes would entail an increased messaging cost which could also degrade the performance of the system as a whole.

Examples of some of these conditions are detailed as follows:

The operator configures a maximum benchmark value beyond which the system 300 for heuristic control cannot set the benchmark during recalibration. The maximum benchmark value is intended to be an operator configured safeguard or threshold. It is intended that the system and method detailed herein abide by these limitations to curb the risk of calibrating a benchmark value that is either too high or too low. In some cases, the system may be access agnostic, and may benefit from a one-time operator configured maximum benchmark to determine the boundaries of a realistic benchmark value for a particular access type for the particular network. In such cases the initial benchmark is set to the maximum benchmark value. In some cases, the value may be fixed based on the access types. For example, LTE could have a maximum benchmark of, for example, 200 ms for aRTT, which could be true for all LTE network access locations. Similarly, for 3G-UMTS the value may be, for example, 40 ms for aRTT, and other networks may be configured correspondingly. The operator or Internet service provider may use maximum benchmark values based on, for example, information in the public domain, information from the data sheets of the network equipment vendors, information based on an analysis of the operator's network, or the like. In other cases, the values may be predetermined by the system.

The operator configures a minimum benchmark value below which the system 300 cannot set the benchmark during recalibration. In such cases the benchmark is set to the minimum benchmark value.

The operator configures a tolerance threshold value, which is intended to prevent recalibration from happening unnecessarily. If, for example, the current calibrated benchmark is 76 ms and the new calibrated benchmark is 75.8 ms, applying further traffic management actions via the traffic management module 304 may not result in noticeable improvement to the QoE. As such, if it is determined that the new calibrated benchmark is within the tolerance threshold value or range, the system 300 may continue to use the previous benchmark value to avoid unnecessary processing. Recalibration may result when the recalibrated benchmark is greater than or less than the current benchmark +/− the tolerance value. In some cases, the tolerance threshold value may be, for example, a percentage of the previous benchmark, for example +/−0.2%, +/−0.5%, +/−1% or the like.

The above operator configured parameters generally need to be set just once during the initial deployment and can be propagated across the network. In some cases, the system may have pre-configured default values for the configuration parameters based on the access location and network settings in use. The operator may override the defaults if appropriate.

The boundary conditions mentioned here can also be used to identify any outlier access network locations which are not behaving within the set boundaries expected of them. For example, if an access network location's recalibrated benchmark consistently falls beyond the maximum benchmark limit then it is likely an indication that there is something anomalous about that access network location. The system 300 can be configured to provide notification to an operator in these situations. The operator can then proceed to examine that access network location in detail to see what the problem is.

There might be a variety of reasons why the access network location's values consistently fall beyond the maximum limit. Some of the reasons may be, for example, poor radio network planning leading to high interference on the radio link thus preventing the users from optimal usage of the data speeds that are provided by the access network location, a fault in the access network equipment which causes it to perform below par, malicious users in a particular access network location creating an artificial resource crunch by hogging the network resources, creating a huge number of traffic flows or SYN/SYN-ACK/ACK flows. Other reasons will be understood and may be discovered when the operator proceeds to examine the access network location to evaluate the problem.

Figure 20:
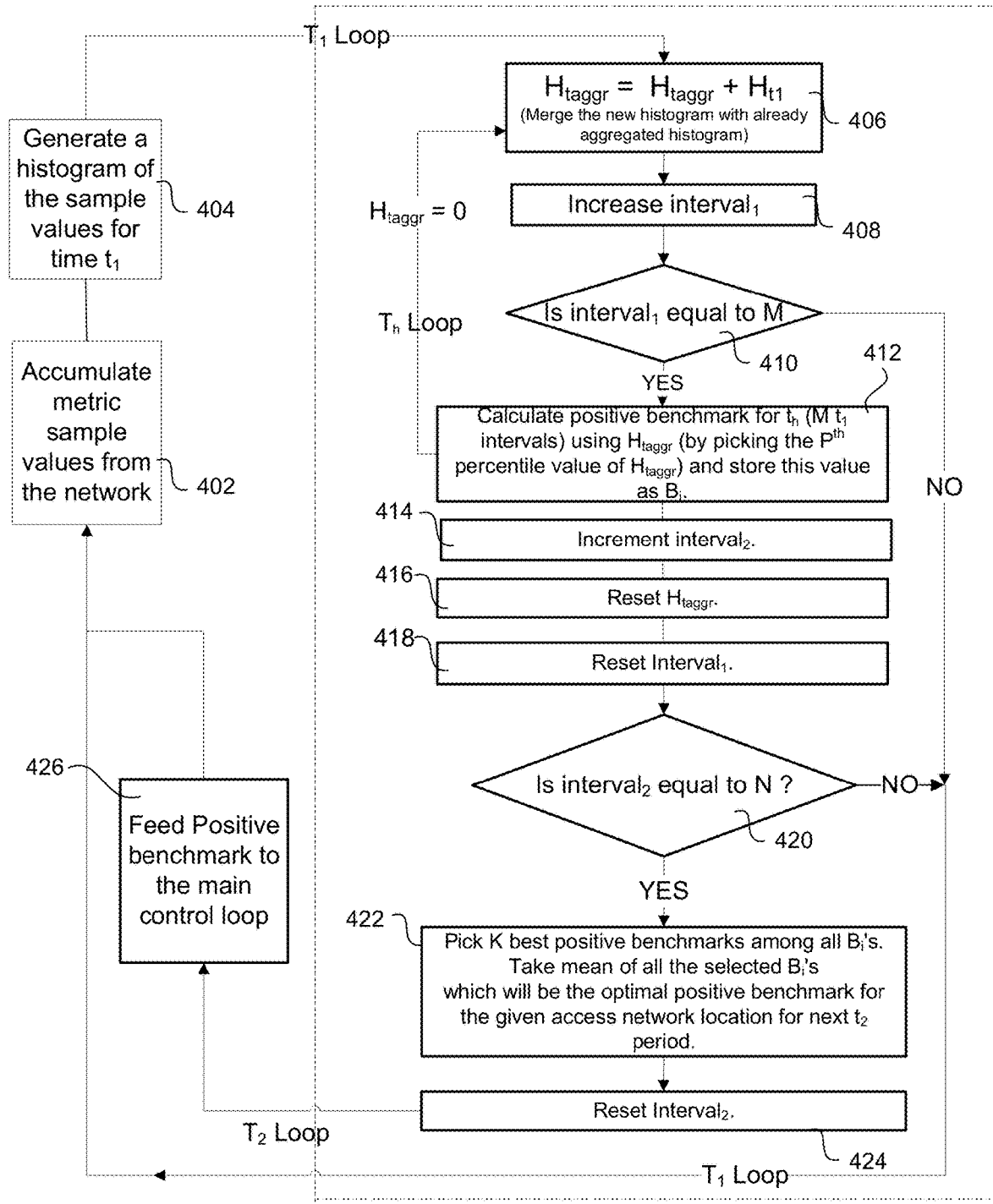
FIG. 20 illustrates an embodiment of a method for heuristic control of traffic management.

An embodiment of a method 400 for heuristic control for traffic management is illustrated in FIG. 20. The following notations/terminologies are used in the flowchart:

$t_1$—Denotes the traffic management control loop and can be considered as the time for every iteration in the traffic management control loop.

$t_h$—Is an intermediate loop which is used to extract intermediate value of positive benchmark which may be used later to generate a more realistic positive benchmark that will be fed to the first control loop. The heuristic calibration module 308 calculates the positive benchmark every $t_2$. To find out the most accurate positive benchmark, the heuristic calibration module 308 may divide the $t_2$ loop into more granular $t_h$ loops. For example, if $t_2$ is 24 hours, $t_h$ may have a duration of 30 minutes, an hour, 2 hours or the like. The heuristic calibration module 308 is configured to generate positive benchmarks $B_i$ every $t_h$ loop. By doing this, the heuristic calibration module knows the positive benchmarks at every granular interval $t_h$. Using the B's obtained, the heuristic calibration module 308 may have a greater control in estimating the positive benchmark.

$t_2$—Denotes the second control loop i.e heuristic calibration algorithm loop which can be considered as the time for every iteration in heuristic calibration loop.

M—Number of $t_1$ iterations to complete $t_h$ interval i.e $M=t_h/t_1$

N—Number of $t_h$ iterations to complete $t_2$ interval i.e $N=t_2/t_h$

K—Number of best intermediate positive benchmarks (generated every $t_h$) to be considered for calculating the realistic positive benchmark that will be fed to the first control loop where K<N.

$H_{t1}$—Histogram of metric samples that is generated every $t_1$ $H_{taggr}$—Histogram of metric samples that is formed by aggregating previous M $H_{t1}$. This histogram generally starts empty and after every loop, it keeps accumulating the $H_{t1}$ every $t_1$ interval for M $t_1$ intervals.

Interval$_1$—A running counter to track the $t_h$ loop. This counter starts with zero and gets incremented every $t_1$ until it reaches M. It is reset after that and the cycle continues.

Interval$_2$—A running counter to track the $t_2$ loop. This counter starts with zero and is incremented every $t_h$ until it reaches N. It is reset after that and the cycle continues.

$B_i$—Positive interim benchmark obtained in the ith $t_h$ interval which will be used as one of the N values to generate the calibrated positive benchmark.

P—$B_i$ is calculated by taking the $P_{th}$ percentile of the $H_{taggr}$ histogram data. Depending on the nature of the parameter to be calibrated, P can vary. P can be smaller to get the best value which is say 5th percentile or greater to get the worst value, say 95%.

At 402, metric sample values are accumulated from the network. The QoE measurement module 306 retrieves sample QoE metrics values from the traffic flow.

At 404, the analysis module 312 generates a histogram from the sample values for the time interval $t_1$. Histograms may be a beneficial manner for determining estimations as the histograms are intended to provide summations, maxima, minima, average of all the data collected over a period of time. In other cases, details of the sample values may be stored separately, for example, average metric value over time, maximum value over time, minimum value over time, and the like, may be continuously or periodically calculated and stored in the data store 310. Storing values separately may require less memory as only a few values may be stored at a time, for example (maximum, minimum, sum of samples and number of samples, or the like), however accuracy of the estimation may be reduced with this option.

At 406, the generated histogram is merged with an already aggregated histogram $H_{taggr}$. In some cases, for example, after a reset of $H_{taggr}$, the generated histogram $H_{t1}$ may not be aggregated but saved as $H_{taggr}$, as $H_{taggr}$ will have been set to a zero or null value. $H_{taggr}$ may be aggregated once a second interval has been completed by the system 300.

The heuristic calibration module 308 divides its loop of operation $t_2$ into multiple smaller th loops. Within every $t_h$ loop, the system aggregates the histogram of metric samples until the system reaches the end of $t_h$ loop. At this point of time, $H_{taggr}$ is used for calculation of positive interim benchmark $B_i$. At the start of fresh th loop, $H_{taggr}$ may also be started as a fresh histogram. The histogram is reset to 0 or empty histogram so that the $1^{st}$ $H_{t1}$ reaching the heuristic calibration module 308 after the start of $t_h$ loop will be directly saved as $H_{taggr}$.

At 408, the interval Interval$_1$ is incremented.

At 410, the heuristic calibration module 308 determines whether Interval$_1$ is equal to a predetermined M value. If the Interval$_1$ is not equal to M, the system 300 will continue to collect samples from the network and provide an updated histogram to the heuristic control module 308 until Interval$_1$ is equal to M.

At 412, if the Interval$_1$ is equal to M, the heuristic control module 308 calculates a positive interim benchmark based on $H_{taggr}$. In some cases, the positive interim benchmark may be calculated by determining the $P^{th}$ percentile value of $H_{taggr}$. This value is saved as $B_i$ in a database 310.

At 414, the interval Interval$_2$ is incremented. At 416, the histogram $H_{taggr}$ is reset to a zero or null value. At 418, the Interval$_1$ is reset to zero.

At 420, the system determines whether the Interval$_2$ is equal to N. If Interval$_2$ is not equal to N, the system performs further loops to accumulate further QoE metrics from the traffic flow.

If Interval$_2$ is equal to N, the heuristic control module 308 may pick K best positive benchmarks among all of the stored $B_i$'s, at 422. In some cases, the heuristic control module 308 may take the mean of all the selected $B_i$'s which is intended to give a favourable positive benchmark for the given access network location for the next $t_2$ period. In other cases, the positive benchmark may be determined by finding the mean of the selected $B_i$'s or the mean of all the $B_i$'s, averaging the selected $B_i$'s or averaging all of the $B_i$'s, or the like.

For some tunable parameters, worse or bigger values may mean better QoE, for example, a negative benchmark. In this case, instead of picking K best positive benchmarks, if $B_i$'s are calculated based on Pth percentile appropriately configured to pick negative benchmark, K worst (or biggest) values may be picked.

At 424, Interval$_2$ is reset and at 426, the positive benchmark is fed to the control module 302 of the system 300.

The following example provides a numerical example using the following parameters:

$t_1$=15 seconds.

$t_h$=1 minute (60 seconds)

$t_2$=15 mins (900 seconds)

$M=t_h/t_1=60/15=4$ $N=t_2/t_h=900/60=15$

K=5

P=5th percentile.

Quality Metric: Handshake RTT of a traffic flow.

Histogram bin boundaries: {−infinity,0,200,400,600,800, 1500,3500,5000, +infinity}

In this example, for every bin boundary, there is a histogram bin whose value increments by 1 every time a value is seen between the bin boundaries. Based on the above bin boundaries, histogram starts as follows—$H_0$={0, 0,0,0,0,0,0,0,0}. Here, every value is a counter corresponding to its associated bin. i.e $1^{st}$ counter corresponds to bin {−infinity,0}. Second counter corresponds to bin {0,20}, $3^{rd}$ counter corresponds to bin {20,40} and so on. If handshake RTT of 50 ms is received by system 300, system 300 sees that this value falls in the bin {40,60}. The counter associated with that bin will be incremented.

Every 15 seconds, system 300 will provide a histogram of RTT samples to the heuristic control module 308. In this example, the following set of histograms are provided by system 300:

$H_{t1}$=0,

At $t_{15}$ seconds={0,0,10,0,0,0,0,0,0; $H_{taggr}=H_{t0}+H_{t15}$={0, 0,10,0,0,0,0,0,0}; $interval_1$=1

At $t_{30}$ seconds={0,10,0,0,0,0,0,0,0}; $H_{taggr}=H_{taggr}+H_{t30}$={0,10,10,0,0,0,0,0,0}; $interval_1$=2;

At $t_{45}$ seconds={0,5,10,0,0,0,0,0,0}; $H_{taggr}=H_{taggr}+H_{t45}$={0,15,20,0,0,0,0,0,0}; $interval_1$=3;

At $t_{60}$ seconds={0,0,0,5,0,0,0,0,0}, number of samples=2; $H_{taggr}=H_{taggr}+H_{t60}$={5,15,20,0,0,0,0,0,0}; $interval_1$=4;

When $interval_1$=M, which is 4 in this example, the 5th percentile of $H_{taggr}$ {0,15,20,5,0,0,0,0,0} is calculated as follows: With total samples=total counts across all bins which is 40. The 5th percentile of the histogram—$B_0$, is the prorated value of histogram bin where 5% of the samples fall less than $B_0$ and the remaining 95% of the samples fall more than $B_0$.

For the above $H_{taggr}$, $B_0$=26.67 ms.

After this, $H_{taggr}$ is reset to {0,0,0,0,0,0,0,0,0}, $interval_1$=0, $interval_2$ is incremented to 1.

This process goes on for $Interval_2$ getting incremented every $T_h$ loop till 15 and $B_0$, $B_1$ and so on till $B_{14}$ are accumulated. From 1st iteration explained above, $B_0$=26.67 ms, assuming the 2nd, 3rd iteration and so on till 15th iteration, the following values Bi={26.67, 30.15, 23.32, 59.64, 75.93, 50.62, 54.04, 19.18, 37.9, 35.7, 32.9, 49.8, 59.4, 67.9, 28.5}.

Now the 5 best, which in this case would be the 5 least values, as the system is measuring latency, among the 15 values. The average of these measurements are taken, In this example, the 5 least values selected are {19.18, 23.32,26.27, 28.5,32.9} and the average of these values gives the positive benchmark B=(19.18+23.32+26.27+28.5+32.9)/5=27.9 ms It will be understood that the above example assumes configuration values which are shown for illustration only.

If perfect QoE is determined, no traffic management action may be applied, and the traffic may continue to be monitored. If the QoE measurement is below the benchmark different levels of traffic management action could be applied depending upon a threshold difference from the benchmark. For example, if the threshold difference from benchmark is directly proportional to the drop in QoE score, the traffic management action that may be applied on the traffic is a factor of the QoE score as well as the traffic management action applied in the previous QoE evaluation interval as detailed herein.

It is intended that the method for heuristic control of traffic management provides for a dynamic solution for calculating the QoE score for each access network location. As each access network location may have varying operating conditions, for example, hardware specifications, location, accessing subscribers, and the like, the system provides for heuristic control of traffic management for each access network location across the network.

The system for heuristic control of traffic management is intended to automatically calibrate the QoE metric based on network traffic patterns in a periodic manner. In some cases, the system is intended to provide for updated benchmarks every $Interval_2$, which may be a predetermined time interval, for example, every 12 hours, every 24 hours, every week, or the like, or the interval may be a predetermined threshold number of QoE metric values received, number of measurements obtained from the traffic flow, number of traffic flows received by the system, bytes seen in either downstream or upstream direction by the system, or the like.

The system for heuristic control of traffic management is intended to determine different benchmarks for each access network location of a network. As each access network location may have different defining characteristics, for example, bandwidth capacity, subscriber density, hardware model, or the like. The different treatment would entail a difference in how the QoE score is calculated for that location, which results in what traffic management action is applied and to what extent. In some cases, a plurality of metrics may be measured. Further, each metric may be assigned a weight. The benchmark may be calculated based on the aggregation of the plurality of metrics and the weights associated with each metric. In other cases, a benchmark could be calculated per metric and the system may review traffic management actions against the plurality of benchmarks to determine an appropriate action to be applied or may apply a plurality of traffic management actions based on the various benchmarks obtained.

It is intended that a single deployment of the system for heuristic control of traffic management would be provided for a heterogeneous network containing access network locations which use different access technologies The system is intended to adapt to the differences of the access network locations from the different access technologies and will adapt the QoE measurement benchmarks accordingly.

In some cases, the system 300 may further include a reporting capability and may be configured to report an outlier access network location which does not match the threshold conditions of the network so that the access network location can be identified and acted upon by the operator. The system 300 may also generator reports that will be useful for network planning by, for example, identifying access locations that may need an upgrade.

In an example, the network may be a 4G LTE network where "HTTP Page load time" is the QoE metric in use. The operator configures 1 ms as the minimum benchmark value and 200 ms as the maximum benchmark value—which become the predetermined thresholds for the system. The thresholds are intended to be a factor of the type of network in use. The heuristic calibration module 308 is bounded such that the heuristic calibration module may calculate calibrated benchmarks only within these minimum and maximum thresholds. If the heuristic calibration module 308 reaches one of the thresholds while trying to calibrate the benchmark, then the network access location for which this threshold benchmark occurred may be reported as an outlier to the operator. Following on from the example, if for a particular cell in the LTE network, the heuristic calibration module 308 calibrates the benchmark HTTP page load time to be 200 ms then this cell is reported as an outlier. The internet service provider or operator may then use this reporting information to investigate the outlier cell and understand why the HTTP page load times are so high. If a problem is identified and rectified the heuristic calibration module 308 may autocorrect the assessment and the benchmarks of the cell within the next calibration interval.

In some cases, the system may use parameters which are not static across time to manage the traffic of a particular access network location. The parameters automatically change update as and when the defining properties of that access network location change. In this case, the QoE metric in use may not change but the underlying physical network did change, and this change is intended to have a considerable effect on the QoE metric value range. The heuristic calibration module 308 is intended to automatically adjust for any such changes in QoE metric value ranges within the next calibration interval.

In the preceding description, for purposes of explanation, numerous details are set forth in order to provide a thorough understanding of the embodiments. However, it will be apparent to one skilled in the art that these specific details may not be required. In other instances, well-known structures and circuits are shown in block diagram form in order not to obscure the understanding. For example, specific details are not provided as to whether the embodiments described herein are implemented as a software routine, hardware circuit, firmware, or a combination thereof.

Embodiments of or elements of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for heuristic control of traffic management on a computer network, the method comprising:
setting a predetermined benchmark against which a quality of experience (QoE) metric can be measured; and
periodically performing a heuristic control loop on a time scale $t_2$ comprising:
performing a traffic management control loop to determine a plurality of sample values of the QoE metric, via a QoE measuring module, on the network based on a traffic flow, wherein the traffic management control loop is performed on a time scale wherein $t_1$ is less than $t_2$;
determining whether the plurality of sample values reaches a minimum sample threshold;
determining at least one traffic management action based on the plurality of sample values of the QoE metric;
aggregating the plurality of sample values of the QoE metric obtained from the traffic management control loop;
determining a new benchmark based on the aggregation of the QoE metric, via a heuristic control module;
sending the new benchmark to the QoE measuring module to become a new predetermined benchmark;
updating the at least one traffic management action to improve the QoE based in part on the new predetermined benchmark; and
determining whether any access location requires an upgrade.

2. The method of claim 1 wherein the determining the new benchmark comprises:
aggregating a subset of the plurality of sample values to determine a plurality of interim benchmark values;
selecting a predetermined number of the plurality of interim benchmark values; and
calculating a new benchmark based on the plurality of interim benchmark values.

3. The method of claim 1 wherein the traffic management control loop comprises:
monitoring traffic on the network to retrieve values related to the QoE metric;
analyzing the retrieved values related to the QoE metric with the predetermined benchmark; and
determining a traffic management action based on the analysis.

4. The method of claim 1 wherein the aggregating of the sample values comprises generating a histogram of the sample values.

5. The method of claim 1 wherein the QoE metric is selected from the group comprising: access Round Trip Time (aRTT), Mean opinion score (MOS), HTTP mean time to page load, HTTP mean time to page render, TCP retransmits, DNS response time, ping response time, video QoE, video jitter, gaming jitter, gaming latency, speed test or 3rd party QoE measurement.

6. The method of claim 1 wherein the determining the new benchmark based on the aggregation of the QoE metric further comprises:
calculating a change between the predetermined benchmark and the new benchmark;
determining whether the change meets a predetermined tolerance range;
if the change meets the predetermined tolerance range, setting the new benchmark to be the same as the predetermined benchmark.

7. The method of claim 1 wherein the heuristic control loop is performed on a 24 hour interval.

8. A system for heuristic control of traffic management on a computer network, the system comprising:
at least one processor connected to a memory storing instructions executable by the at least one processor to implement:

a heuristic calibration module configured to set a predetermined benchmark for traffic;

a quality of experience (QoE) measuring module configured to determine a plurality of sample values of a QoE metric, on the network based on a traffic flow, via a traffic management control loop performed on a time scale of $t_1$, determine whether the plurality of sample values reaches a minimum sample threshold, and determine at least one traffic management action based on the plurality of sample values of the QoE metric;

an analysis module configured to aggregate the plurality of sample values of the QoE metric obtained from the QoE measuring module;

the heuristic calibration module further configured to determine a new benchmark based on the aggregation of the QoE metric via a heuristic control loop on a time scale $t_2$, wherein $t_1$ is less than $t_2$; and send the new benchmark to the QoE measuring module to become a new predetermined benchmark; and a traffic management module configured to update the traffic management actions to improve the QoE based in part on the new predetermined benchmark and determine whether any access location requires an upgrade.

9. The system of claim 8 wherein the analysis module is further configured to aggregate a subset of the plurality of sample values to determine a plurality of interim benchmark values; and the heuristic calibration module is configured to select a predetermined number of the plurality of interim benchmark values, and calculate a new benchmark based on the plurality of interim benchmark values.

10. The system of claim 8, wherein the QoE measurement module is configured to monitor traffic on the network to retrieve the plurality of sample values related to the QoE metric; and the system further comprises:

a control system module configured to analyze the retrieved values related to the QoE metric with the predetermined benchmark; and a traffic management module configured to determine a traffic management action based on the analysis.

11. The method of claim 1, wherein $t_1$ is in an order of seconds and $t_2$ is in an order of hours.

12. The method of claim 1 wherein the QoE metric is measured from a plurality of access networks and a predetermined benchmark varies per access network.

13. The method of claim 1 further comprising repeating the heuristic control loop to further refine the at least one traffic management action.

14. The method of claim 1 further comprising:

updating at least one piece of network equipment;

performing the heuristic control loop after the at least one piece of network equipment has been updated, to update the predetermined benchmark and the at least one traffic management action.

15. The method of claim 1 wherein the traffic management control loop requires a minimum number of sample values to be considered a valid input to the heuristic control loop.

* * * * *